United States Patent
Takado et al.

(10) Patent No.: US 12,413,873 B2
(45) Date of Patent: Sep. 9, 2025

(54) PHOTOELECTRIC CONVERSION DEVICE

(71) Applicant: CANON KABUSHIKI KAISHA, Tokyo (JP)

(72) Inventors: Hisashi Takado, Kanagawa (JP); Takashi Sugai, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/658,677

(22) Filed: May 8, 2024

(65) Prior Publication Data
US 2024/0388816 A1 Nov. 21, 2024

(30) Foreign Application Priority Data
May 17, 2023 (JP) ................................. 2023-081648

(51) Int. Cl.
*H04N 25/773* (2023.01)

(52) U.S. Cl.
CPC ................................. *H04N 25/773* (2023.01)

(58) Field of Classification Search
CPC ....... H04N 25/773; H04N 25/46; H04N 25/78
See application file for complete search history.

(56) References Cited

U.S. PATENT DOCUMENTS

| | | |
|---|---|---|
| 9,900,532 B2 | 2/2018 | Takado |
| 9,900,535 B2 | 2/2018 | Takado |
| 9,912,886 B2 | 3/2018 | Shigeta |
| 10,044,992 B2 | 8/2018 | Takado |
| 10,122,951 B2 | 11/2018 | Takado |
| 10,244,192 B2 | 3/2019 | Shigeta |
| 10,477,165 B2 | 11/2019 | Takado |
| 10,645,325 B2 | 5/2020 | Takado |
| 10,979,647 B2 | 4/2021 | Takado |
| 11,057,582 B2 | 7/2021 | Takado |
| 11,159,759 B2 | 10/2021 | Takado |
| 11,284,023 B2 | 3/2022 | Yamanaka |
| 11,297,273 B2 | 4/2022 | Sekine |
| 11,418,733 B2 | 8/2022 | Takado |
| 2009/0245684 A1 | 10/2009 | Makii |
| 2012/0049077 A1 | 3/2012 | Okada |
| 2020/0209393 A1* | 7/2020 | Aoki ................ G01S 17/32 |

(Continued)

FOREIGN PATENT DOCUMENTS

| | | |
|---|---|---|
| JP | 2020-28081 A | 2/2020 |
| JP | 2023-59522 A | 4/2023 |

*Primary Examiner* — Michael E Teitelbaum
(74) *Attorney, Agent, or Firm* — VENABLE LLP

(57) ABSTRACT

A photoelectric conversion device includes: pixels each including a photoelectric conversion unit and a counting unit generating a count value based on incident light to the photoelectric conversion unit; and a calculation unit performing interpolation processing on the count value. Each pixel is controlled to either a first state in which generation of the count value is enabled or a second state in which that is disabled. In a first sub-frame period, a first pixel is in the first state, and a second pixel is in the second state. In a second sub-frame period, the second pixel is in the first state, and the first pixel is in the second state. The calculation unit calculates a second count value of the first pixel in the second sub-frame period by performing the interpolation processing using a first count value generated in the second pixel in the second sub-frame period.

20 Claims, 23 Drawing Sheets

(56) References Cited

U.S. PATENT DOCUMENTS

| | | | |
|---|---|---|---|
| 2020/0314369 A1* | 10/2020 | Yamanaka | H04N 25/40 |
| 2023/0236297 A1* | 7/2023 | Finkelstein | G01S 17/10 |
| | | | 356/5.01 |
| 2024/0098381 A1 | 3/2024 | Takado | |

* cited by examiner

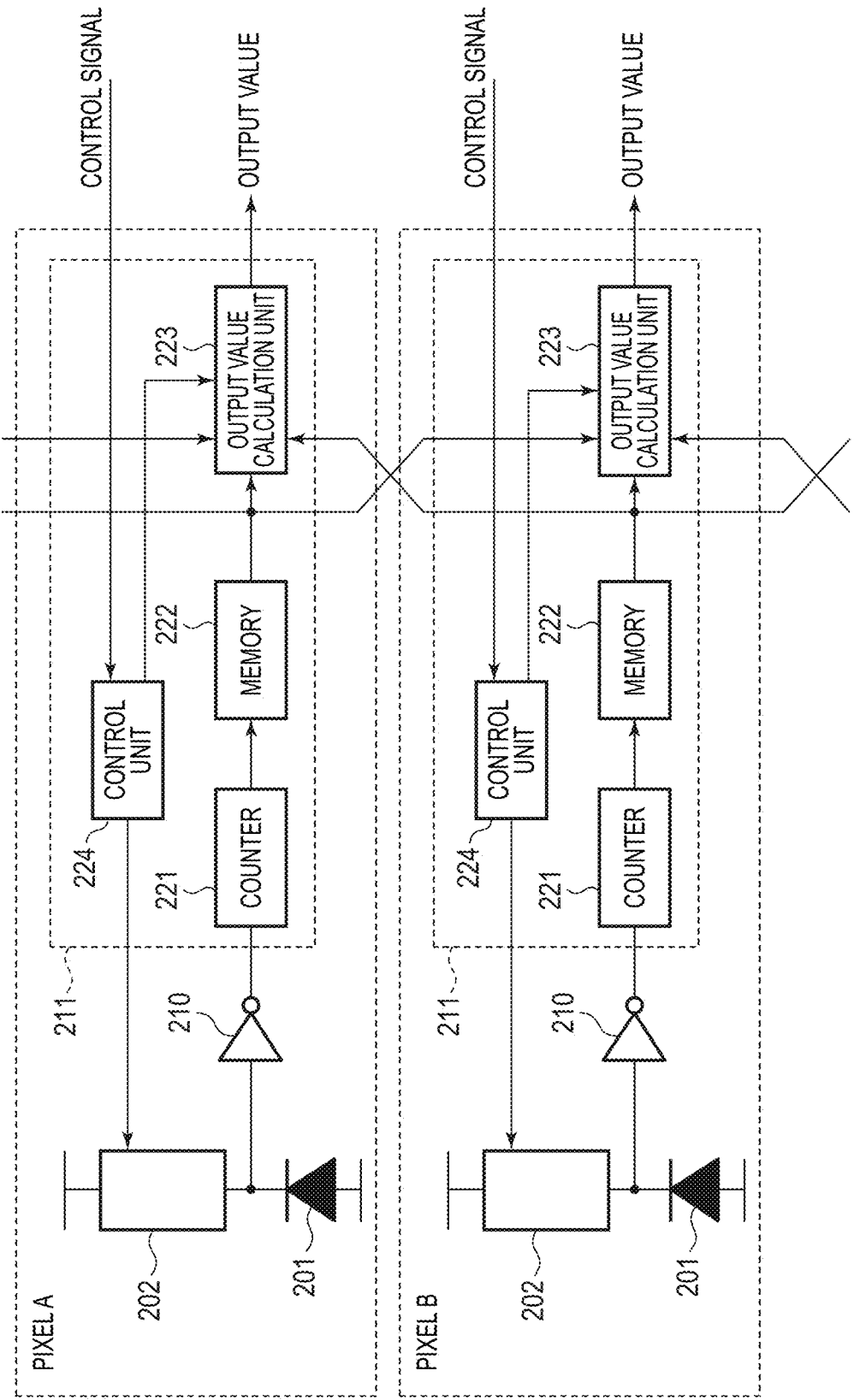

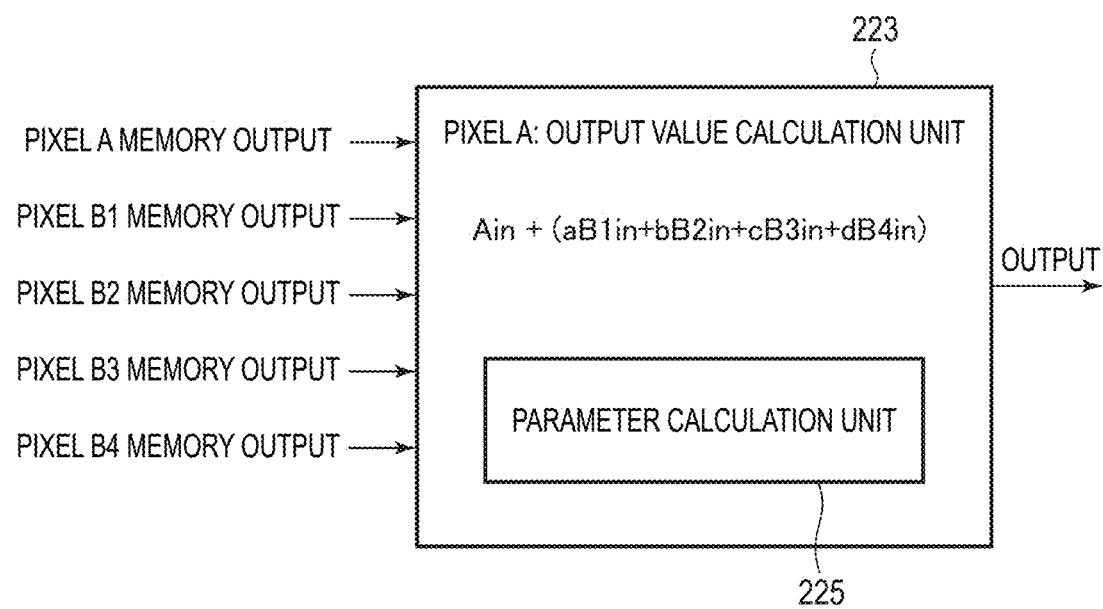

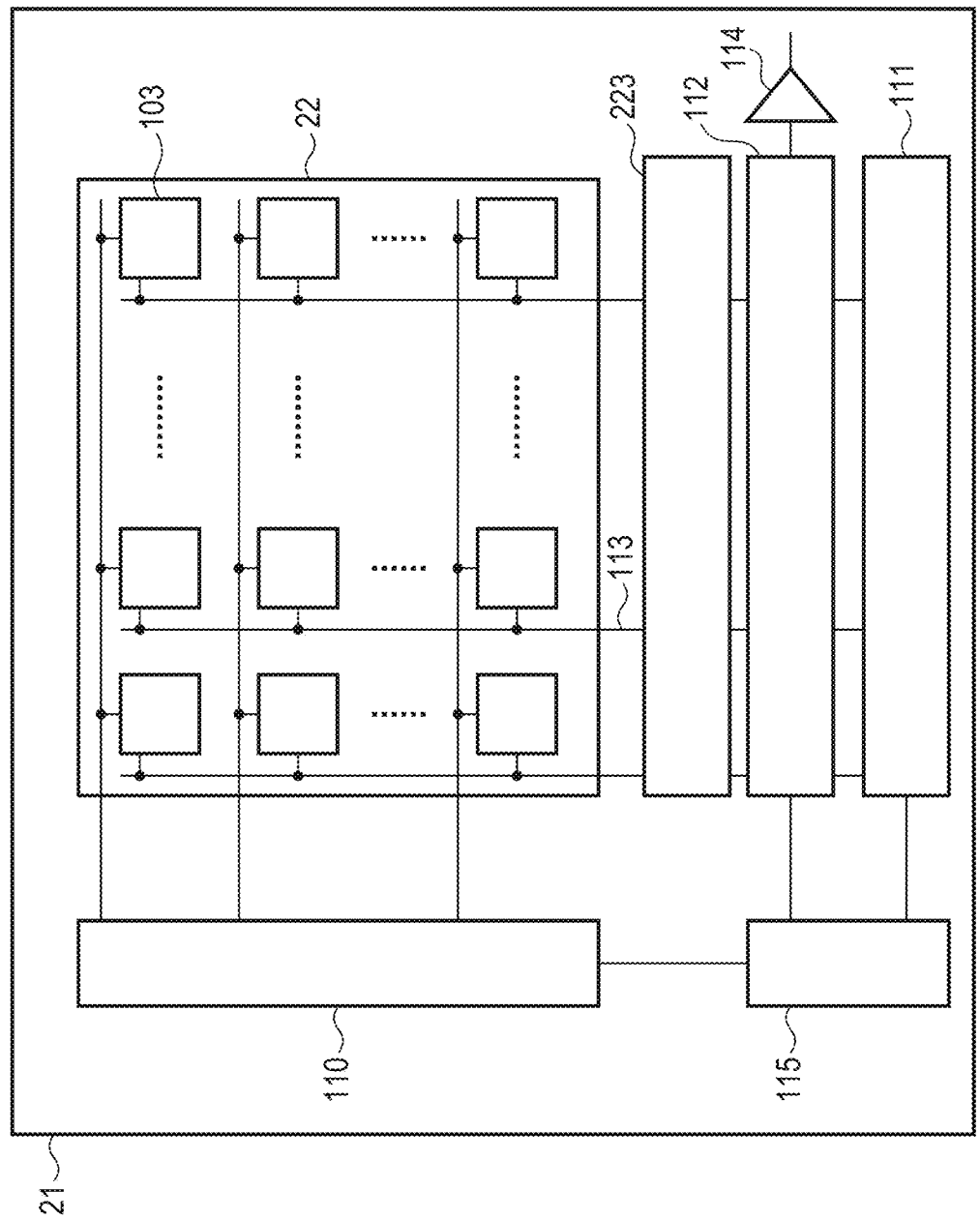

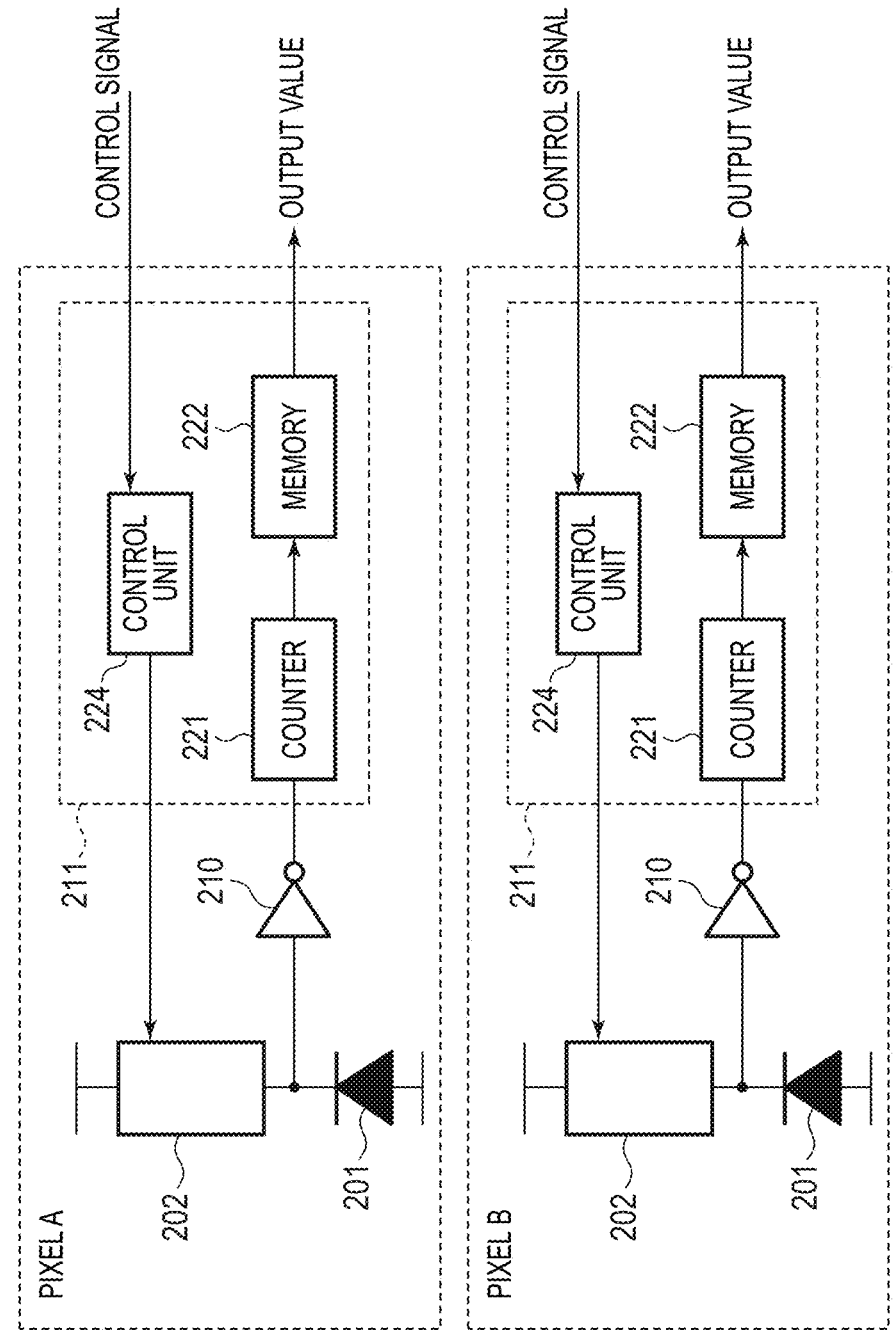

FIG. 13

| A | C | A | C | A |
|---|---|---|---|---|
| B | D | B | D | B |
| A | C | A | C | A |
| B | D | B | D | B |
| A | C | A | C | A |

BL

PHOTOELECTRIC CONVERSION DEVICE

BACKGROUND

Field

The present invention relates to a photoelectric conversion device.

Description of the Related Art

Japanese Patent Application Laid-Open No. 2020-28081 discloses an imaging device using an avalanche photodiode. The imaging device disclosed in Japanese Patent Application Laid-Open No. 2020-28081 switches between a state in which photons are detected and a state in which photons are not detected within one exposure period. Thereby, power consumption is reduced in the imaging device disclosed in Japanese Patent Application Laid-Open No. 2020-28081.

However, in a photoelectric conversion device in which there is a period during which photons are not detected as in Japanese Patent Application Laid-Open No. 2020-28081, the detection accuracy of incident light may not be sufficient.

SUMMARY

An object of the present invention is to provide a photoelectric conversion device capable of improving the detection accuracy of incident light.

According to an embodiment of the present disclosure, there is provided a photoelectric conversion device including: a plurality of pixels each including a photoelectric conversion unit and a counting unit configured to generate a count value based on incident light to the photoelectric conversion unit; and a calculation unit configured to perform interpolation processing on the count value. Each of the plurality of pixels is controlled to either a first state in which generation of the count value based on the incident light is enabled or a second state in which generation of the count value based on the incident light is disabled. The plurality of pixels includes a first pixel and a second pixel. In a first sub-frame period in one frame period, the first pixel is controlled to the first state, and the second pixel is controlled to the second state. In a second sub-frame period in the one frame period, the second pixel is controlled to the first state, and the first pixel is controlled to the second state. The calculation unit calculates a second count value of the first pixel in the second sub-frame period by performing the interpolation processing using a first count value generated in the second pixel in the second sub-frame period.

Further features of the present invention will become apparent from the following description of exemplary embodiments with reference to the attached drawings.

BRIEF DESCRIPTION OF THE DRAWINGS

FIG. 6 is a schematic block diagram illustrating a configuration example of two pixels according to the first embodiment.

FIG. 10A, FIG. 10B, and FIG. 10C are diagrams illustrating a pixel arrangement and an output value calculation unit according to a third embodiment.

FIG. 11 is a schematic block diagram illustrating a configuration example of a circuit substrate according to a fourth embodiment.

FIG. 12 is a schematic block diagram illustrating a configuration example of two pixels according to the fourth embodiment.

FIG. 13 is a diagram illustrating a pixel arrangement according to the fourth embodiment.

DESCRIPTION OF THE EMBODIMENTS

Figure 1:
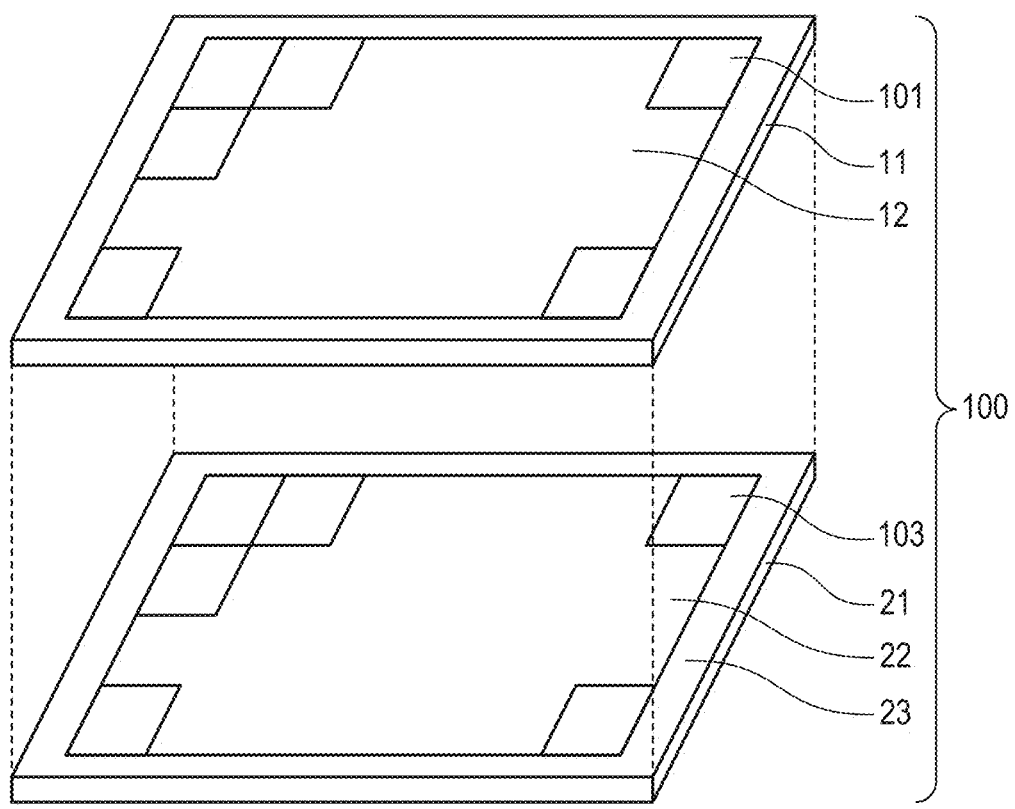
FIG. 1 is a schematic view illustrating an overall configuration of a photoelectric conversion device according to a first embodiment.

Embodiments of the present invention will now be described with reference to the accompanying drawings. The following embodiments are intended to embody the technical idea of the present invention and do not limit the present invention. The sizes and positional relationships of the members illustrated in the drawings may be exaggerated for clarity of explanation. In the drawings, the same or corresponding elements are denoted by the same reference numerals, and the description thereof may be omitted or simplified.

In the following description, a term indicating a specific direction or position is used as necessary (for example, "upper", "lower", "right", "left", and other terms including them). The use of these terms is intended to facilitate understanding of the embodiments with reference to the drawings, and the technical scope of the present invention is not limited by the meaning of these terms.

First Embodiment

FIG. 1 is a schematic diagram illustrating an overall configuration of a photoelectric conversion device 100 according to the present embodiment. The photoelectric conversion device 100 may be, for example, a solid-state imaging device, a focus detection device, a ranging device, a time-of-flight (TOF) camera, or the like. The photoelectric conversion device 100 includes a sensor substrate 11 and a circuit substrate 21 stacked on each other. The sensor substrate 11 and the circuit substrate 21 are electrically connected to each other. The sensor substrate 11 has a pixel region 12 in which a plurality of pixel circuits 101 are arranged to form a plurality of rows and a plurality of columns. The circuit substrate 21 includes a first circuit region 22 in which a plurality of pixel signal processing units 103 are arranged to form a plurality of rows and a plurality of columns, and a second circuit region 23 arranged outside the first circuit region 22. The second circuit region 23 may include a circuit for controlling the plurality of pixel signal processing units 103. The sensor substrate 11 has a light incident surface for receiving incident light and a connection surface opposed to the light incident surface. The sensor substrate 11 is connected to the circuit substrate 21 on the connection surface side. That is, the photoelectric conversion device 100 is a so-called backside illumination type.

In this specification, the term "plan view" refers to a view from a direction perpendicular to a surface opposite to the light incident surface. The cross section indicates a surface in a direction perpendicular to a surface opposite to the light incident surface of the sensor substrate 11. Although the light incident surface may be a rough surface when viewed microscopically, in this case, a plan view is defined with reference to the light incident surface when viewed macroscopically.

In the following description, the sensor substrate 11 and the circuit substrate 21 are diced chips, but the sensor substrate 11 and the circuit substrate 21 are not limited to chips. For example, the sensor substrate 11 and the circuit substrate 21 may be wafers. When the sensor substrate 11 and the circuit substrate 21 are diced chips, the photoelectric conversion device 100 may be manufactured by being diced after being stacked in a wafer state, or may be manufactured by stacking chips after being diced.

Figure 2:
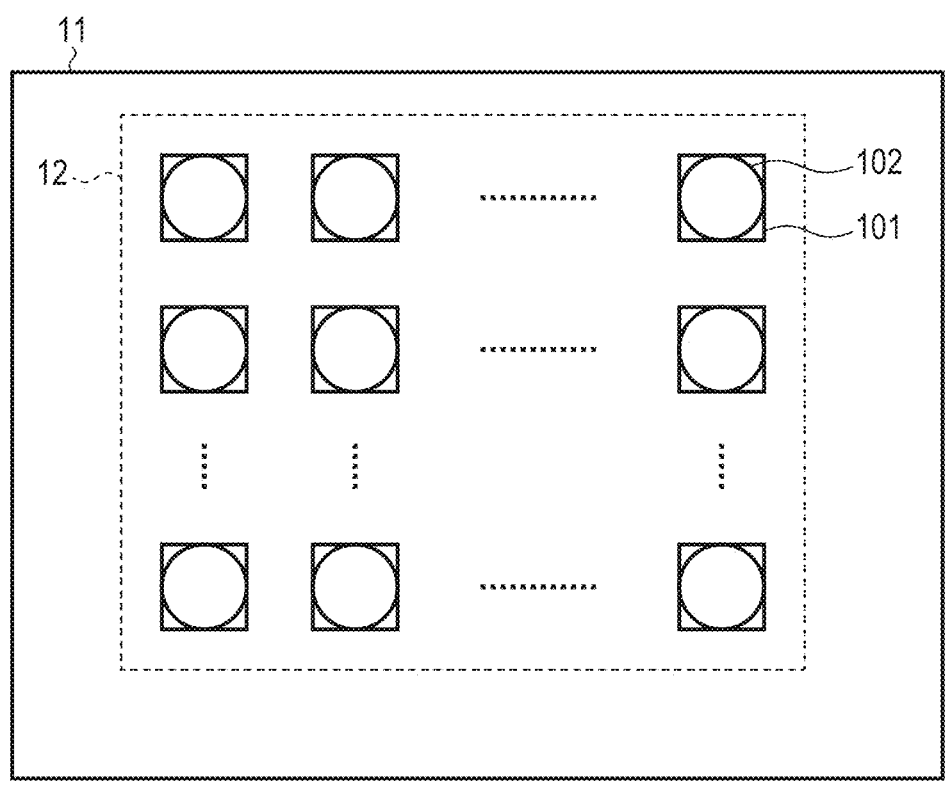
FIG. 2 is a schematic block diagram illustrating a configuration example of a sensor substrate according to the first embodiment.

FIG. 2 is a schematic block diagram illustrating a configuration example of the sensor substrate 11 according to the present embodiment. In the pixel region 12, a plurality of pixel circuits 101 are arranged to form a plurality of rows and a plurality of columns. Each of the plurality of pixel circuits 101 includes a photoelectric conversion unit 102 including an avalanche photodiode (hereinafter referred to as APD) as a photoelectric conversion element. When the photoelectric conversion device 100 is an imaging device, the plurality of pixel circuits 101 may be elements that generate signals for an image by photoelectric conversion. However, in the case where the photoelectric conversion device 100 is a ranging device using a technology such as TOF, the pixel circuit 101 may be an element for measuring the time at which light arrives and the amount of light. That is, the application of the plurality of pixel circuits 101 is not limited to image acquisition.

Of the charge pairs generated in the APD, the conductivity type of the charge used as the signal charge is referred to as a first conductivity type. The first conductivity type refers to a conductivity type in which a charge having the same polarity as the signal charge is a majority carrier. Further, a conductivity type opposite to the first conductivity type, that is, a conductivity type in which a majority carrier is a charge having a polarity different from that of a signal charge is referred to as a second conductivity type. In the APD described below, the anode of the APD is set to a fixed potential, and a signal is extracted from the cathode of the APD. Accordingly, the semiconductor region of the first conductivity type is an N-type semiconductor region, and the semiconductor region of the second conductivity type is a P-type semiconductor region. Note that the cathode of the APD may have a fixed potential and a signal may be extracted from the anode of the APD. In this case, the semiconductor region of the first conductivity type is the P-type semiconductor region, and the semiconductor region of the second conductivity type is then N-type semiconductor region. Although the case where one node of the APD is set to a fixed potential is described below, potentials of both nodes may be varied.

In this specification, when the term "impurity concentration" is used, it means a net impurity concentration obtained by subtracting the amount compensated by the impurity of the opposite conductivity type. That is, the "impurity concentration" refers to the net doping concentration. A region where the added impurity concentration of the P type is higher than the added impurity concentration of the N type is a P type semiconductor region. Conversely, a region where the added impurity concentration of the N type is higher than the added impurity concentration of the P type is an N type semiconductor region.

Figure 3:
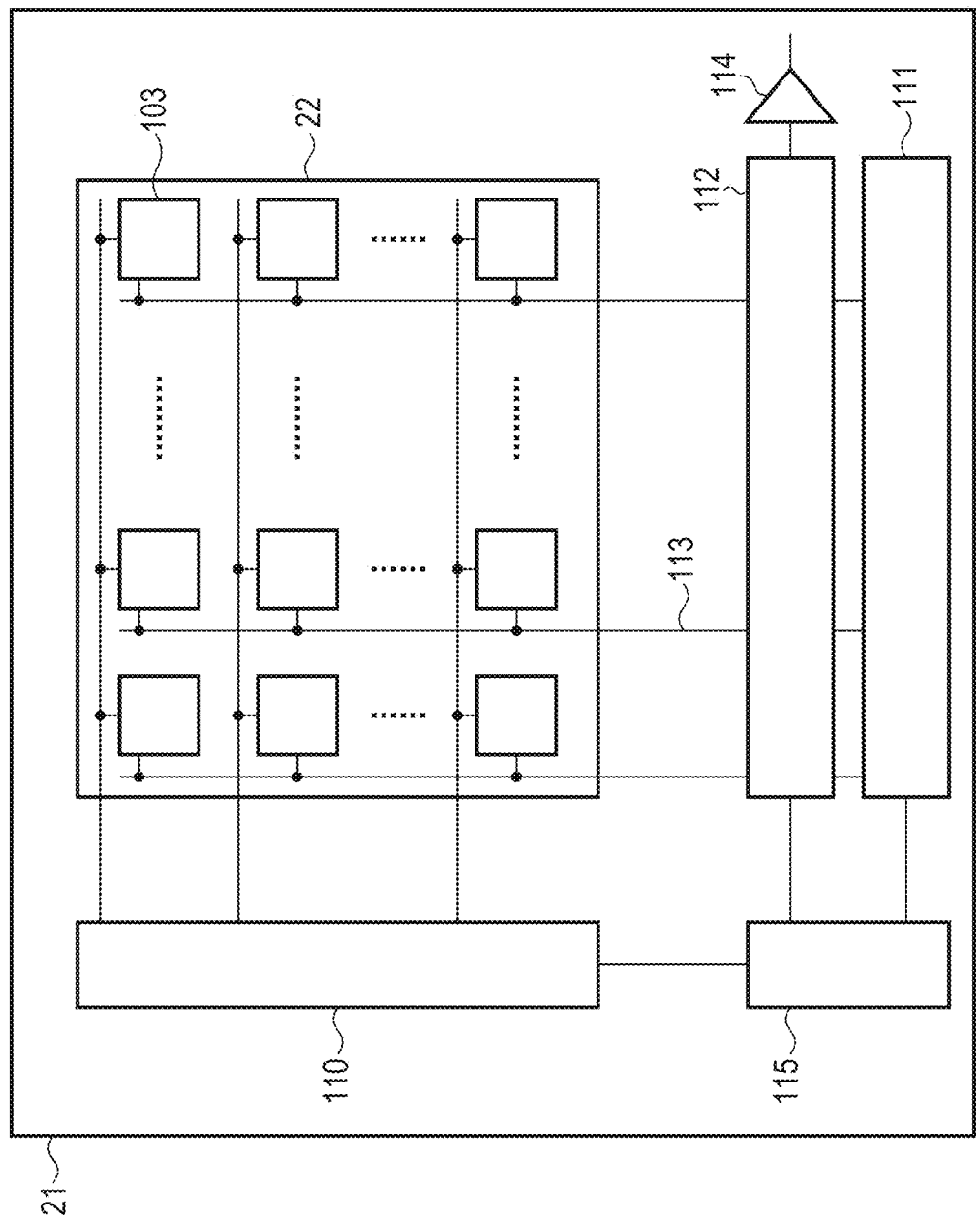
FIG. 3 is a schematic block diagram illustrating a configuration example of a circuit substrate according to the first embodiment.

FIG. 3 is a schematic block diagram illustrating a configuration example of the circuit substrate 21 according to the present embodiment. The circuit substrate 21 has the first circuit region 22 in which a plurality of pixel signal processing units 103 are arranged to form a plurality of rows and a plurality of columns.

The circuit substrate 21 includes a vertical scanning circuit 110, a horizontal scanning circuit 111, a reading circuit 112, a pixel output signal line 113, an output circuit 114, and a control signal generation unit 115. The plurality of photoelectric conversion units 102 illustrated in FIG. 2 and the plurality of pixel signal processing units 103 illustrated in FIG. 3 are electrically connected to each other via connection wirings provided for each pixel circuits 101.

The control signal generation unit 115 is a control circuit that generates control signals for driving the vertical scanning circuit 110, the horizontal scanning circuit 111, and the reading circuit 112, and supplies the control signals to these units. As a result, the control signal generation unit 115 controls the driving timings and the like of each unit.

The vertical scanning circuit 110 supplies control signals to each of the plurality of pixel signal processing units 103 based on the control signal supplied from the control signal generation unit 115. The vertical scanning circuit 110 supplies control signals for each row to the pixel signal processing unit 103 via a driving line provided for each row of the first circuit region 22. As will be described later, a plurality of driving lines may be provided for each row. A logic circuit such as a shift register or an address decoder can be used for the vertical scanning circuit 110. Thus, the vertical scanning circuit 110 selects a row to be output a signal from the pixel signal processing unit 103.

The signal output from the photoelectric conversion unit 102 of the pixel circuit 101 is processed by the pixel signal processing unit 103. The pixel signal processing unit 103 counts the number of pulses output from the APD included in the photoelectric conversion unit 102 to acquire and hold a digital signal.

The horizontal scanning circuit 111 supplies control signals to the reading circuit 112 based on a control signal supplied from the control signal generation unit 115. The pixel signal processing unit 103 is connected to the reading circuit 112 via a pixel output signal line 113 provided for each column of the first circuit region 22. The pixel output signal line 113 in one column is shared by a plurality of pixel signal processing units 103 in the corresponding column. The pixel output signal line 113 includes a plurality of wirings, and has at least a function of outputting a digital signal from the pixel signal processing unit 103 to the reading circuit 112, and a function of supplying a control signal for selecting a column for outputting a signal to the pixel signal processing unit 103. The reading circuit 112 outputs a signal to an external storage unit or signal processing unit of the photoelectric conversion device 100 via the output circuit 114 based on the control signal supplied from the control signal generation unit 115.

The arrangement of the photoelectric conversion units 102 in the pixel region 12 may be arranged one-dimensional. Further, the function of the pixel signal processing unit 103 does not necessarily have to be provided one by one in all the pixel circuits 101. For example, one pixel signal processing unit 103 may be shared by a plurality of pixel circuits 101. In this case, the pixel signal processing unit 103 sequentially processes the signals output from the photoelectric conversion units 102, thereby providing the function of signal processing to each pixel circuit 101.

As illustrated in FIGS. 2 and 3, the first circuit region 22 having a plurality of pixel signal processing units 103 is arranged in a region overlapping the pixel region 12 in the plan view. In the plan view, the vertical scanning circuit 110, the horizontal scanning circuit 111, the reading circuit 112, the output circuit 114, and the control signal generation unit 115 are arranged so as to overlap a region between an edge of the sensor substrate 11 and an edge of the pixel region 12. In other words, the sensor substrate 11 includes the pixel region 12 and a non-pixel region arranged around the pixel region 12. In the circuit substrate 21, the second circuit region 23 having the vertical scanning circuit 110, the horizontal scanning circuit 111, the reading circuit 112, the output circuit 114, and the control signal generation unit 115 is arranged in a region overlapping with the non-pixel region in the plan view.

Note that the arrangement of the pixel output signal line 113, the arrangement of the reading circuit 112, and the arrangement of the output circuit 114 are not limited to those illustrated in FIG. 3. For example, the pixel output signal lines 113 may extend in the row direction, and may be shared by a plurality of pixel signal processing units 103 in corresponding rows. The reading circuit 112 may be provided so as to be connected to the pixel output signal line 113 of each row.

Figure 4:
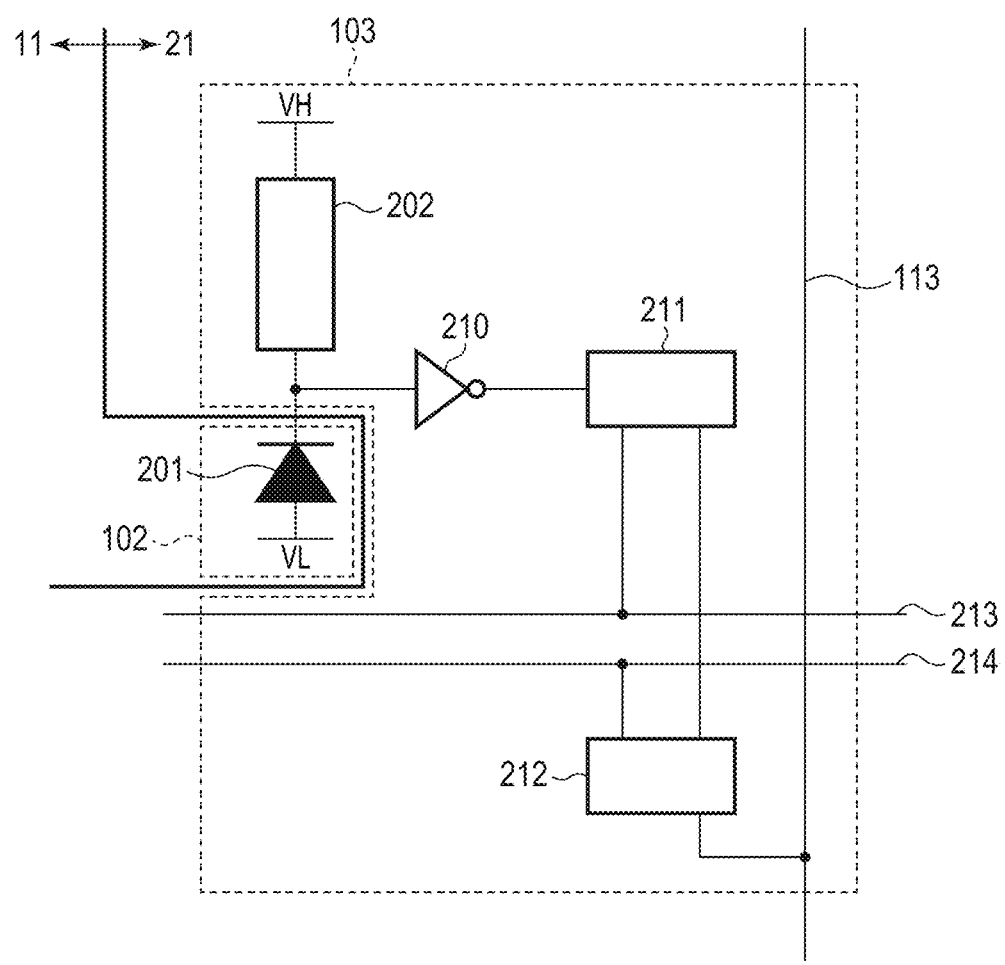
FIG. 4 is a schematic block diagram illustrating a configuration example of one pixel of a photoelectric conversion unit and a pixel signal processing unit according to the first embodiment.

FIG. 4 is a schematic block diagram illustrating a configuration example of one pixel of the photoelectric conversion unit 102 and the pixel signal processing unit 103 according to the present embodiment. FIG. 4 schematically illustrates a more specific configuration example including a connection relationship between the photoelectric conversion unit 102 arranged in the sensor substrate 11 and the pixel signal processing unit 103 arranged in the circuit substrate 21. In FIG. 4, driving lines between the vertical scanning circuit 110 and the pixel signal processing unit 103 in FIG. 3 are illustrated as driving lines 213 and 214.

The photoelectric conversion unit 102 includes an APD 201. The pixel signal processing unit 103 includes a quenching element 202, a waveform shaping unit 210, a counting unit 211, and a selection circuit 212. The pixel signal processing unit 103 may include at least one of the waveform shaping unit 210, the counting circuit 211, and the selection circuit 212.

The APD 201 is a photoelectric conversion unit that generates a charge pair corresponding to incident light by photoelectric conversion. A voltage VL (first voltage) is supplied to the anode of the APD 201. The cathode of the APD 201 is connected to a first terminal of the quenching element 202 and an input terminal of the waveform shaping unit 210. A voltage VH (second voltage) higher than the voltage VL supplied to the anode is supplied to the cathode of the APD 201. As a result, a reverse bias voltage that causes the APD 201 to perform the avalanche multiplication operation is supplied to the anode and the cathode of the APD 201. In the APD 201 to which the reverse bias voltage is supplied, when a charge is generated by the incident light, this charge causes avalanche multiplication, and an avalanche current is generated.

The operation modes in the case where a reverse bias voltage is supplied to the APD 201 include a Geiger mode and a linear mode. The Geiger mode is a mode in which a potential difference between the anode and the cathode is higher than a breakdown voltage, and the linear mode is a mode in which a potential difference between the anode and the cathode is near or lower than the breakdown voltage.

The APD operated in the Geiger mode is referred to as a single photon avalanche diode (SPAD). In this case, for example, the voltage VL (first voltage) is −30 V, and the voltage VH (second voltage) is 1 V. The APD 201 may operate in the linear mode or the Geiger mode. In the case of the SPAD, a potential difference becomes greater than that of the APD of the linear mode, and the effect of avalanche multiplication becomes significant, so that the SPAD is preferable.

The quenching element 202 functions as a load circuit (quenching circuit) when a signal is multiplied by avalanche multiplication. The quenching element 202 suppresses the voltage supplied to the APD 201 and suppresses the avalanche multiplication (quenching operation). Further, the quenching element 202 returns the voltage supplied to the APD 201 to the voltage VH by passing a current corresponding to the voltage drop due to the quenching operation (recharge operation). The quenching element 202 may be, for example, a P-type MOS transistor. In this case, when a potential is input as a control signal to a gate of the P-type MOS transistor, the P-type MOS transistor is controlled to be on or off, and the recharge operation is controlled to be enabled or disabled. Thus, the pixel is controlled to be in either a detection state in which the count value can be generated according to the incident light or a non-detection state in which the count value is not generated.

The waveform shaping unit 210 is a circuit that shapes the potential change of the cathode of the APD 201 obtained at the time of photon detection, and outputs a pulse signal. For example, an inverter circuit is used as the waveform shaping unit 210. Although FIG. 4 illustrates an example in which one inverter is used as the waveform shaping unit 210, the waveform shaping unit 210 may be a circuit in which a plurality of inverters are connected in series, or may be another circuit having a waveform shaping effect.

The counting unit 211 counts the number of pulses output from the waveform shaping unit 210, and holds a digital signal indicating the count value. When a control signal is supplied from the vertical scanning circuit 110 through the driving line 213, the counting unit 211 resets the held signal.

The selection circuit 212 is supplied with a control signal from the vertical scanning circuit 110 illustrated in FIG. 3 through the driving line 214 illustrated in FIG. 4. In response to this control signal, the selection circuit 212 switches between the electrical connection and the non-connection of the counting unit 211 and the pixel output signal line 113. The selection circuit 212 includes, for example, a buffer circuit or the like for outputting a signal corresponding to a value held in the counting unit 211.

In the example of FIG. 4, the selection circuit 212 switches between the electrical connection and the non-connection of the counting unit 211 and the pixel output signal line 113; however, the method of controlling the signal output to the pixel output signal line 113 is not limited thereto. For example, a switch such as a transistor may be arranged at a node such as between the quenching element 202 and the APD 201 or between the photoelectric conversion unit 102 and the pixel signal processing unit 103, and the signal output to the pixel output signal line 113 may be controlled by switching the electrical connection and the non-connection. Alternatively, the signal output to the pixel output signal line 113 may be controlled by changing the value of the voltage VH or the voltage VL supplied to the photoelectric conversion unit 102 using a switch such as a transistor.

FIG. 4 illustrates a configuration example in which the counting unit 211 including a counter is used. However, instead of the counting unit 211, a time-to-digital conversion circuit (time-to-digital converter: hereinafter referred to as TDC) and a memory may be used to acquire a timing at which a pulse is detected. In this case, the generation timing of the pulse signal output from the waveform shaping unit 210 is converted into a digital signal by the TDC. In this case, a control signal (reference signal) can be supplied from the vertical scanning circuit 110 illustrated in FIG. 3 to the TDC via the driving line. The TDC acquires, as a digital signal, a signal indicating a relative time of a pulse input timing with reference to the control signal.

Figure 5A:
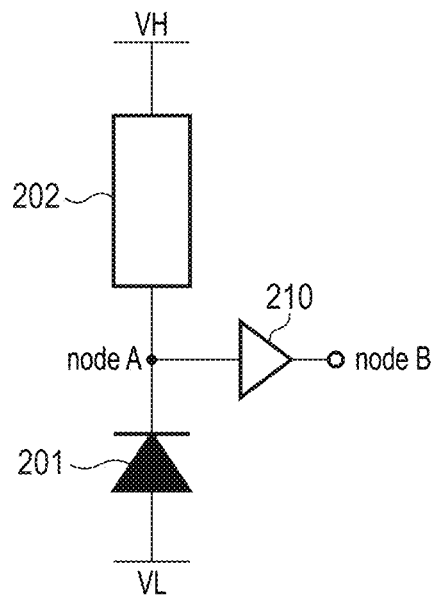
FIG. 5A, FIG. 5B, and FIG. 5C are diagrams illustrating an operation of an avalanche photodiode according to the first embodiment.
Figure 5B:
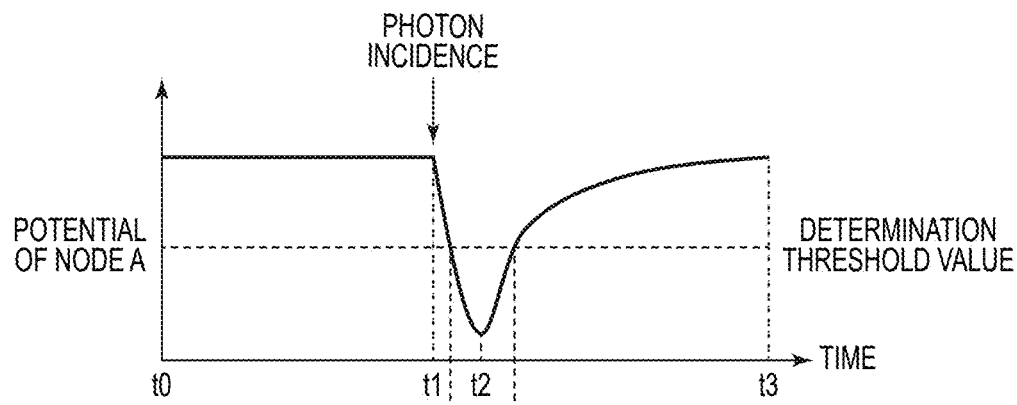
Figure 5C:
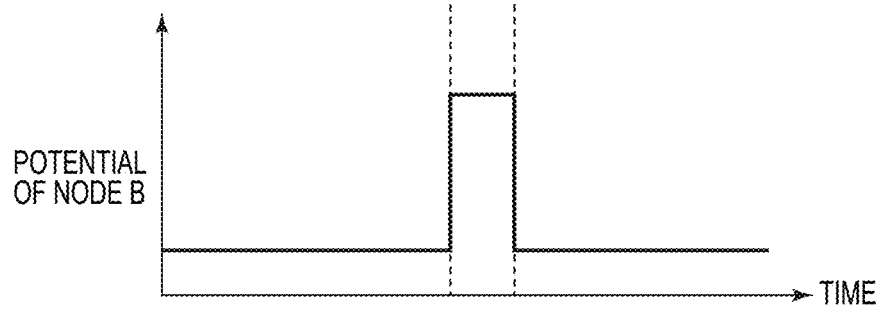

FIGS. 5A, 5B, and 5C are diagrams illustrating an operation of the APD 201 according to the present embodiment. FIG. 5A is a diagram illustrating the APD 201, the quenching element 202, and the waveform shaping unit 210 in FIG. 4. As illustrated in FIG. 5A, the connection node of the APD 201, the quenching element 202, and the input terminal of the waveform shaping unit 210 is referred to as node A. Further, as illustrated in FIG. 5A, an output side of the waveform shaping unit 210 is referred to as node B.

FIG. 5B is a graph illustrating a temporal change in the potential of node A in FIG. 5A. FIG. 5C is a graph illustrating a temporal change in the potential of node B in FIG. 5A. During a period from time t0 to time t1, the voltage VH-VL is applied to the APD 201 in FIG. 5A. When a photon enters the APD 201 at the time t1, avalanche multiplication occurs in the APD 201. As a result, an avalanche current flows through the quenching element 202, and the potential of the node A drops. Thereafter, the amount of potential drop further increases, and the voltage applied to the APD 201 gradually decreases. Then, at time t2, the avalanche multiplication in the APD 201 stops. Thereby, the voltage level of node A does not drop below a certain constant value. Then, during a period from the time t2 to time t3, a current that compensates for the voltage drop flows from the node of the voltage VH to the node A, and the node A is settled to the original potential at the time t3.

In the above-described process, the potential of node B becomes the high level in a period in which the potential of node A is lower than a certain threshold value. In this way, the waveform of the drop of the potential of the node A caused by the incidence of the photon is shaped by the waveform shaping unit 210 and output as a pulse to the node B.

Hereinafter, the configuration and operation of the photoelectric conversion device 100 of the present embodiment will be described in detail with reference to FIGS. 6 to 8.

FIG. 6 is a schematic block diagram illustrating a configuration example of two pixels of the photoelectric conversion device 100 according to the present embodiment. FIG. 6 illustrates a more specific configuration of two pixels (each including the photoelectric conversion unit 102 and the pixel signal processing unit 103) adjacent to each other in the vertical direction. As illustrated in FIGS. 1 to 3, the plurality of pixels are arranged to form the plurality of rows and the plurality of columns, and two of them are extracted and illustrated in FIG. 6. These two pixels are referred to as a pixel A (first pixel) and a pixel B (second pixel). Each of the pixel A and the pixel B includes the APD 201, the quenching element 202, the waveform shaping unit 210, and the counting unit 211. The counting unit 211 includes a counter 221, a memory 222, an output value calculation unit 223, and a control unit 224. In FIG. 6, illustration of the selection circuit 212 illustrated in FIG. 4 is omitted.

The counter 221 counts pulses output from the waveform shaping unit 210. The memory 222 holds the count value output from the counter 221 based on a latch signal (not illustrated).

The control unit 224 receives a control signal output from a control circuit and controls the quenching element 202. Thus, the control unit 224 switches between a detection state (first state) in which generation of a count value according to incident light to the APD 201 is enabled and a non-detection state (second state) in which generation of a count value according to incident light to the APD 201 is disabled. For example, when the quenching element 202 is a P-type MOS transistor, the control unit 224 controls the potential of the gate of the P-type MOS transistor to realize switching of the state. The pixel A and the pixel B may be controlled to different states. That is, the pixel A and the pixel B can be controlled to switch between a state in which the pixel A is in the detection state and the pixel B is in the non-detection state, and a state in which the pixel A is in the non-detection state and the pixel B is in the detection state.

The output value calculation unit 223 acquires the count value held in the memory 222 of the pixel A and the count value held in the memory 222 of the pixel B to perform a predetermined operation, and outputs the result to the reading circuit 112. The details of the calculation processing will be described later.

Figure 7A:
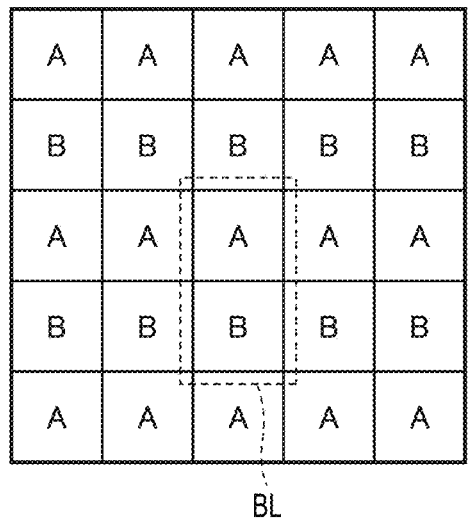
FIG. 7A and FIG. 7B are diagrams illustrating a pixel arrangement and driving timings according to the first embodiment.
Figure 7B:
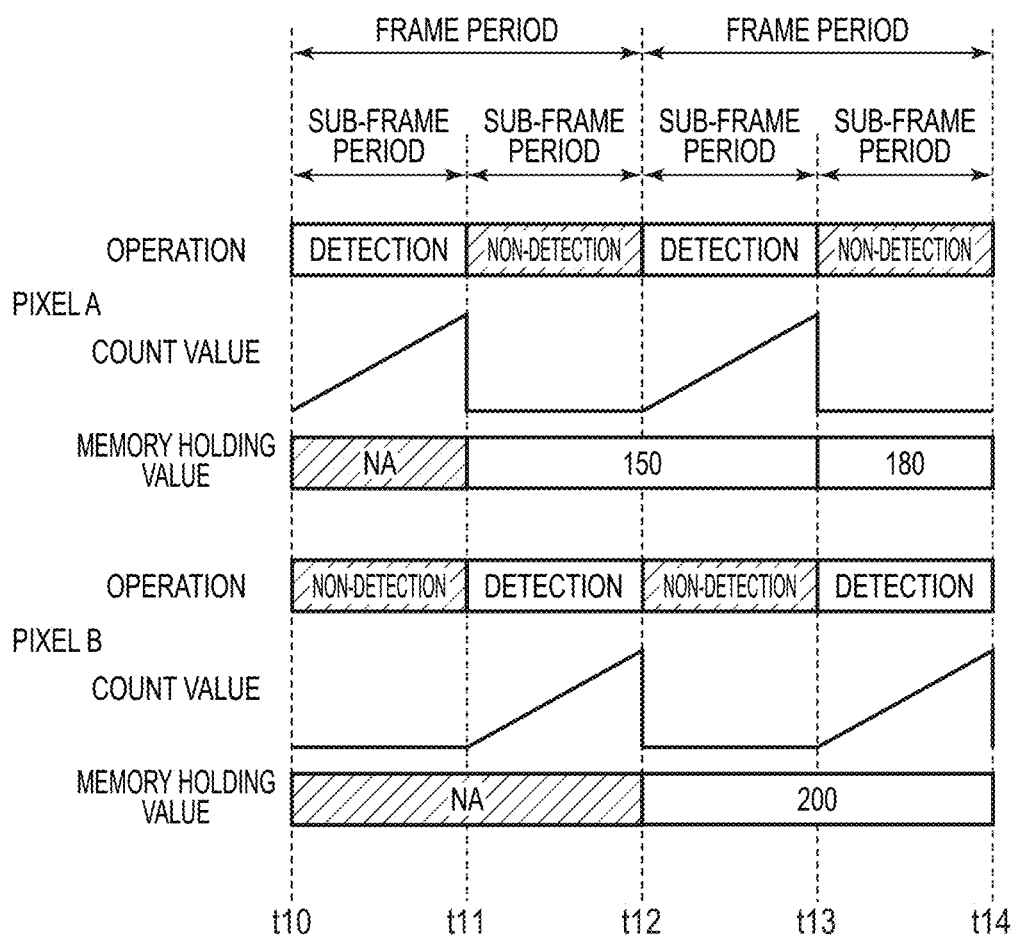

FIG. 7A is a schematic diagram illustrating a pixel arrangement in the photoelectric conversion device 100 according to the present embodiment. FIG. 7B is a diagram illustrating driving timings in the photoelectric conversion device 100 according to the present embodiment.

FIG. 7A schematically illustrates five rows and five columns among the plurality of pixels arranged to form the plurality of rows and the plurality of columns. The "A" in FIG. 7A indicates the pixel A in FIG. 6, and the "B" in FIG. 7A indicates the pixel B in FIG. 6. As illustrated in FIG. 7A, either the pixel A or the pixel B is arranged in one row, and the row in which the pixel A is arranged and the row in which the pixel B is arranged are alternately arranged. That is, the pixel A and the pixel B are arranged in a stripe shape. A pixel block BL in two rows and one column illustrated in FIG. 7A are one unit of the arrangement of the pixel A and the pixel B.

FIG. 7B is an explanatory diagram of driving timings of the pixel A and the pixel B. FIG. 7B illustrates a detection or non-detection operation of each of the pixel A and the pixel B, a count value of the counter 221, and a value held in the memory 222. FIG. 7B illustrates the operation in two frame periods. One frame period includes two sub-frame periods. Each of times t10, t11, t12, t13, and t14 is the start time and the end time of the sub-frame period. Each of the times t10, t12, and t14 is the start time and the end time of the frame period.

At the time t10, the first sub-frame period starts. In the first sub-frame period, the pixel A is in the detection state, and the pixel B is in the non-detection state. In the pixel A, the counter 221 starts counting photons from the time t10. At the time t11, the first sub-frame period ends. The count value "150" of the counter 221 of the pixel A at the time t11 is held in the memory 222 of the pixel A.

At the time t11, the second sub-frame period starts. In the second sub-frame period, the pixel A is in the non-detection state and the pixel B is in the detection state. In the pixel B, the counter 221 starts counting photons from the time t11. At the time t12, the second sub-frame period ends. The count value "200" of the counter 221 of the pixel B at the time t12 is held in the memory 222 of the pixel B.

At the time t12, the count value (third count value) corresponding to the incident light in the first sub-frame period is held in the memory 222 of the pixel A, and the count value (first count value) corresponding to the incident light in the second sub-frame period is held in the memory 222 of the pixel B. In this manner, the operation in one frame period from the time t10 to the time t12 ends.

In the pixel A, the incident light is not detected in the second sub-frame period from the time t11 to the time t12. The signal corresponding to this period is interpolated by the output value calculation unit 223 of the pixel A using at least the output signal of the pixel B in the second sub-frame period. In addition, in the pixel B, the incident light is not detected in the first sub-frame period from the time t10 to the time t11. The signal corresponding to this period is interpolated by the output value calculation unit 223 of the pixel B using at least the output signal of the pixel A in the first sub-frame period. This interpolation processing is performed during a period from the time t12 to the time t14, and the processed signal is read out to the reading circuit 112 via the pixel output signal line 113.

During the period from the time t12 to the time t14, the processing of the next one frame period is performed. Since the processing in this period is substantially the same as the processing from the time t10 to the time t12, the description thereof will be omitted.

Figure 8:
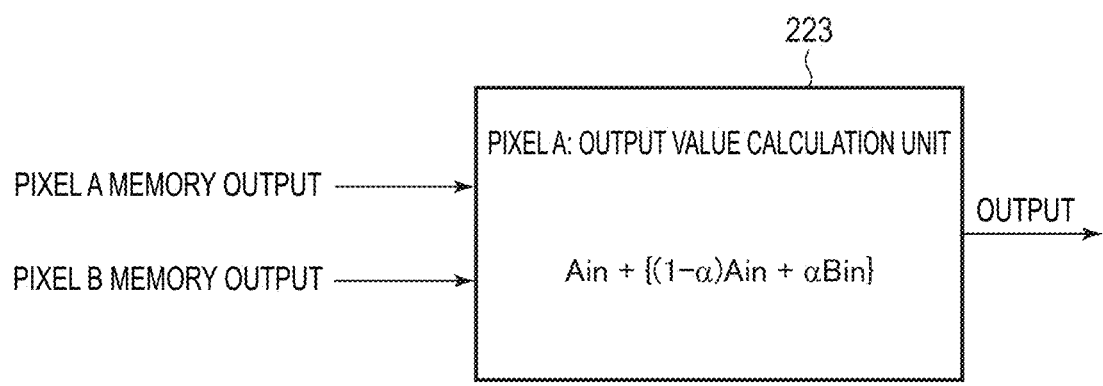
FIG. 8 is a diagram illustrating an output value calculation unit according to the first embodiment.

FIG. 8 is a schematic diagram illustrating the output value calculation unit 223 of the pixel A according to the present embodiment. As illustrated in FIG. 8, the output value of the memory 222 of the pixel A and the output value of the memory 222 of the pixel B are input to the output value calculation unit 223 of the pixel A. The output value calculation unit 223 of the pixel A performs the calculation of the following expression (1) based on those input values.

$$Aout = Ain + \{(1-\alpha)Ain + \alpha Bin\} \quad (1)$$

In the expression (1), Aout is an output value of the output value calculation unit 223 of the pixel A, Ain is an output value of the memory 222 of the pixel A, Bin is an output value of the memory 222 of the pixel B, and $\alpha$ is an interpolation parameter. The interpolation parameter $\alpha$ is a parameter for determining weighting of Ain and Bin, and is determined in advance in a range of $0<\alpha\leq1$. As described above, Ain is the count value of the pixel A detected in the first sub-frame period, and Bin is the count value of the pixel B detected in the second sub-frame period. The interpolation parameter $\alpha$ may be dynamically determined based on input signals such as Ain and Bin.

The first term of the expression (1) is the count value (third count value) of the pixel A detected in the first sub-frame period. The second term of the expression (1) is an interpolation value (second count value) corresponding to the count value of the pixel A in the second sub-frame period. As indicated in the expression (1), the output value calculation unit 223 adds the first term which is the count value of the pixel A detected in the first sub-frame period and the second term which is the interpolation value, and outputs the sum. The interpolation value is calculated based on at least the output value of the memory 222 of the pixel B, as indicated in the expression (1). When the interpolation parameter $\alpha$ is one, the interpolation value is calculated based on only the output value of the memory 222 of the pixel B. When the interpolation parameter $\alpha$ is not one, the interpolation value is calculated based on the output value of the memory 222 of the pixel A and the output value of the memory 222 of the pixel B.

In the present embodiment, as illustrated in FIG. 7B, a part of the plurality of pixels is in the non-detection state in one frame period. Thus, power consumption is reduced in one frame period as compared with the case where all of the plurality of pixels are in the detection state.

Since the pixel in the non-detection state cannot detect the incident light, the detection accuracy may not be sufficiently obtained depending on the state of the incident light. Examples of such a case include a case where incident light largely varies in a short time due to movement of an object, flashlight, or the like. However, in the present embodiment, even in the case where the incident light to the pixel A largely varies within the sub-frame period in which the pixel A is in the non-detection state, the detection accuracy can be maintained by performing the interpolation processing using the output value of the adjacent pixel B. Therefore, according to the present embodiment, a photoelectric conversion device capable of improving the detection accuracy of incident light is provided.

Note that when interpolation is performed using output values of different pixels, a false signal may occur. As indicated in the expression (1), when the interpolation parameter $\alpha$ is not one, interpolation including weighted addition of the output value of the pixel A in the preceding sub-frame period and the output value of the pixel B is performed. This makes it possible to perform the interpolation considering the balance between the influence of the false signal and the reduction of the influence of the variation of the incident light.

Second Embodiment

A photoelectric conversion device 100 according to a second embodiment will be described with reference to FIGS. 9A to 9C. In the description of the present embodiment, the description of elements common to those of the first embodiment may be omitted. The present embodiment is different from the first embodiment in that the output value calculation unit 223 of the pixel A performs interpolation based on the output values of the memories 222 of the plurality of pixels B.

Figure 9A:
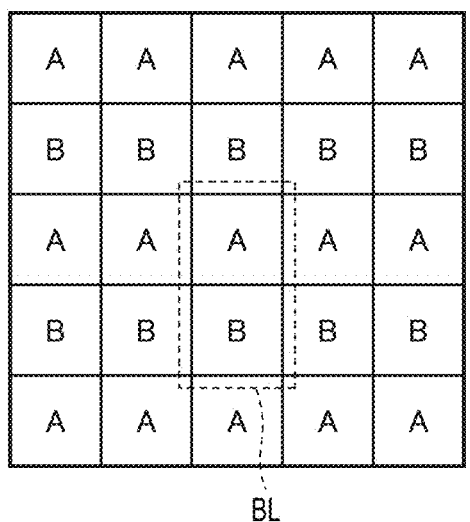
FIG. 9A, FIG. 9B, and FIG. 9C are diagrams illustrating a pixel arrangement and an output value calculation unit according to a second embodiment.

FIG. 9A is a schematic diagram illustrating a pixel arrangement in the photoelectric conversion device 100 according to the present embodiment. FIG. 9B is a schematic diagram illustrating positions of a plurality of pixels B used for interpolation processing for a center pixel A. FIG. 9C is a schematic diagram illustrating the output value calculation unit 223 of the pixel A according to the present embodiment.

Since the pixel arrangement illustrated in FIG. 9A is substantially the same as that of FIG. 7A, description thereof will be omitted. As illustrated in FIG. 9B, two upper and lower pixels B of the pixel A are used for interpolation processing of the pixel A. A pixel above the pixel A is referred to as a pixel B1, and a pixel below the pixel A is referred to as a pixel B2.

Figure 9B:
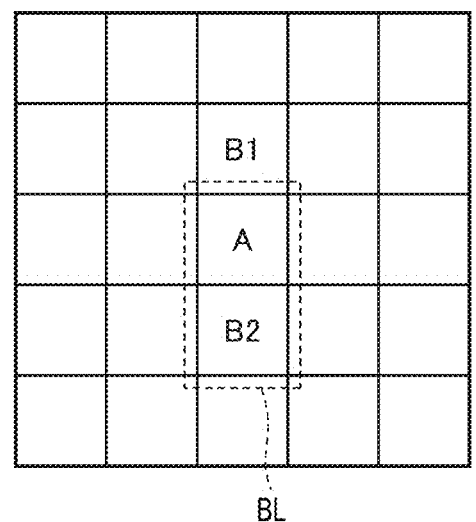
Figure 9C:
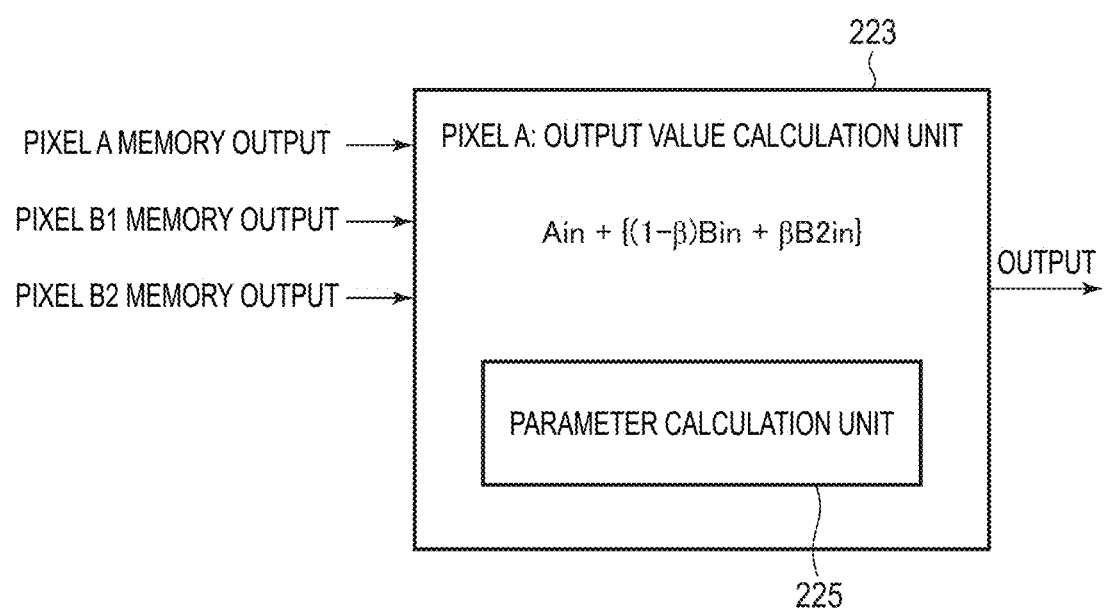

As illustrated in FIG. 9C, the output value of the memory 222 of the pixel A, the output value of the memory 222 of the pixel B1, and the output value of the memory 222 of the pixel B2 are input to the output value calculation unit 223 of the pixel A. The output value calculation unit 223 of the pixel A performs the calculation of the following expression (2) based on those input values.

$$Aout = Ain + \{(1 - \beta)B1in + \beta B2in\} \qquad (2)$$

In the expression (2), Aout is an output value of the output value calculation unit 223 of the pixel A, Ain is an output value of the memory 222 of the pixel A, B1in is an output value of the memory 222 of the pixel B1, B2in is an output value of the memory 222 of the pixel B2, and β is an interpolation parameter. The output value calculation unit 223 of the pixel A includes a parameter calculation unit 225 that calculates the interpolation parameter β. The interpolation parameter β is a parameter for determining the weighting of B1in and B2in, and is determined in a range of 0<β≤1.

The first term of the expression (2) is the count value of the pixel A detected in the first sub-frame period. The second term of the expression (2) is an interpolation value corresponding to the count value of the pixel A in the second sub-frame period. As indicated in the expression (2), the output value calculation unit 223 adds the first term which is the count value of the pixel A detected in the first sub-frame period and the second term which is the interpolation value, and outputs the sum. The interpolation value is calculated based on at least the output value of the memory 222 of the pixel B2, as indicated in the expression (2). When the interpolation parameter β is one, the interpolation value is calculated based on only the output value of the memory 222 of the pixel B2. When the interpolation parameter β is not one, the interpolation value is calculated based on the output value of the memory 222 of the pixel B1 and the output value of the memory 222 of the pixel B2.

The parameter calculation unit 225 calculates the interpolation parameter β by comparing the output value of the pixel A, the output value of the pixel B1, and the output value of the pixel B2. For example, by comparing the output values of the pixel A and the pixel B1, or by comparing the output values of the pixel A and the pixel B2, presence of an edge portion of an object at a position corresponding to these pixels, movement of the object, and the like can be detected.

Based on these comparison results, the parameter calculation unit 225 calculates the interpolation parameter β.

According to the present embodiment, similarly to the first embodiment, a photoelectric conversion device capable of improving the detection accuracy of incident light is provided. Further, in the present embodiment, since more pixels B are used for interpolation processing than in the first embodiment, detection accuracy can be further improved.

Third Embodiment

A photoelectric conversion device 100 according to a third embodiment will be described with reference to FIGS. 10A to 10C. In the description of the present embodiment, the description of elements common to the first embodiment and the second embodiment may be omitted. The present embodiment is a modification of the second embodiment. The present embodiment is different from the second embodiment in that the output value calculation unit 223 of the pixel A performs interpolation based on the output values of the memories 222 of the four pixels B.

FIG. 10A is a schematic diagram illustrating a pixel arrangement in the photoelectric conversion device 100 according to the present embodiment. FIG. 10B is a schematic diagram illustrating positions of a plurality of pixels B used for interpolation processing for a center pixel A. FIG. 10C is a schematic diagram illustrating the output value calculation unit 223 of the pixel A according to the present embodiment.

As illustrated in FIG. 10A, the pixels A and the pixels B are alternately arranged in one row, and the pixels A and the pixels B are alternately arranged in one column. That is, the pixels A and B are arranged in a checker pattern.

As illustrated in FIG. 9B, four upper, lower, left, and right pixels B of the pixel A are used for interpolation processing of the pixel A. A pixel above the pixel A is referred to as a pixel B1, and a pixel below the pixel A is referred to as a pixel B2. A pixel on the left of the pixel A is referred to as a pixel B3, and a pixel on the right of the pixel A is referred to as a pixel B4.

As illustrated in FIG. 10C, the output value of the memory 222 of the pixel A and the output values of the memories 222 of the pixel B1 to the pixel B4 are input to the output value calculation unit 223 of the pixel A. The output value calculation unit 223 of the pixel A calculates the following expression (3) based on those input values.

$$Aout = Ain + (aB1in + bB2in + cB3in + dB4in) \qquad (3)$$

In the expression (3), Aout is an output value of the output value calculation unit 223 of the pixel A, Ain is an output value of the memory 222 of the pixel A, B1in to B4in are output values of the memories 222 of the pixel B1 to the pixel B4, respectively, and a, b, c, and d are interpolation parameters. The output value calculation unit 223 of the pixel A includes a parameter calculation unit 225 that calculates the interpolation parameters a, b, c, and d. The interpolation parameters a, b, c, and d are parameters for determining weighting of B1in to B4in, and are determined so as to satisfy a+b+c+d=1.

The first term of the expression (3) is the count value of the pixel A detected in the first sub-frame period. The second term of the expression (3) is an interpolation value corresponding to the count value of the pixel A in the second sub-frame period. As indicated in the expression (3), the output value calculation unit 223 adds the first term which is the count value of the pixel A detected in the first sub-frame period and the second term which is the interpolation value, and outputs the sum. The interpolation value is calculated based on the output values of the memories 222 of the pixel B1 to the pixel B4 as indicated in the expression (3).

The parameter calculation unit 225 calculates the interpolation parameters a, b, c, and d by comparing the output value of the pixel A with the output values of the pixel B1 to the pixel B4. For example, by comparing the output values of the pixel A, the pixel B1, the pixel B2, the pixel B3, and the pixel B4, presence of an edge portion of an object at a position corresponding to these pixels, movement of the object, and the like can be detected. Based on these comparison results, the parameter calculation unit 225 calculates interpolation parameters a, b, c, and d.

According to the present embodiment, similarly to the first embodiment and the second embodiment, a photoelectric conversion device capable of improving the detection accuracy of incident light is provided. Further, in the present embodiment, since more pixels B are used for interpolation processing than in the second embodiment, detection accuracy can be further improved.

In the second embodiment and the third embodiment, the number of pixels B used in the interpolation processing is two and four, but the number of the pixels B is not limited thereto. For example, the number of pixels B used in the interpolation processing may be four or more.

Fourth Embodiment

A photoelectric conversion device 100 according to a fourth embodiment will be described with reference to FIGS. 11 to 15B. In the description of the present embodiment, the description of elements common to the first to third embodiments may be omitted. The present embodiment is different from the first to third embodiments in that the pixel blocks BL includes two rows and two columns, and one frame period is divided into four sub-frame periods.

FIG. 11 is a schematic block diagram illustrating a configuration example of the circuit substrate 21 according to the present embodiment. An output value calculation unit 223 is arranged in the circuit substrate 21. The output value calculation unit 223 has a function of performing interpolation processing in the same manner as the output value calculation unit 223 described in the first to third embodiments. The output value calculation unit 223 processes signals that are input via a plurality of pixel output signal lines 113 arranged corresponding to respective columns on a column basis. That is, the signals output from a plurality of pixels in one column are input to the output value calculation unit 223 via a common pixel output signal line 113, and the signals are processed.

FIG. 12 is a schematic block diagram illustrating a configuration example of two pixels of the photoelectric conversion device 100 according to the present embodiment. As illustrated in FIG. 11, in the present embodiment, the output value calculation unit 223 is arranged outside the pixel. Therefore, in FIG. 12, unlike FIG. 6, the output value calculation unit 223 is not arranged in the pixel. In the present embodiment, since output signals from many pixels are used for processing of the output value calculation unit 223, the circuit scale of the output value calculation unit 223 is large. Since the output value calculation unit 223 is arranged outside the pixel rather than inside the pixel, an increase in the occupied area of the pixel is avoided.

Although the pixel C and the pixel D are arranged in the pixel block BL in the present embodiment as described later, they are not illustrated in FIG. 12.

Figure 13:
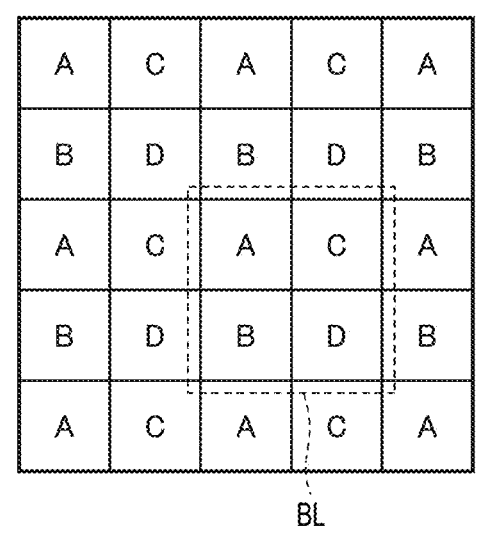

FIG. 13 is a schematic diagram illustrating a pixel arrangement in the photoelectric conversion device 100 according to the present embodiment. In the present embodiment, the pixel block BL includes four pixels of two rows and two columns. These four pixels are referred to as a pixel A (first pixel), a pixel B (second pixel), a pixel C (third pixel), and a pixel D (fourth pixel). In FIG. 13, "A", "B", "C", and "D" represent the pixel A, the pixel B, the pixel C, and the pixel D, respectively.

Figure 14:
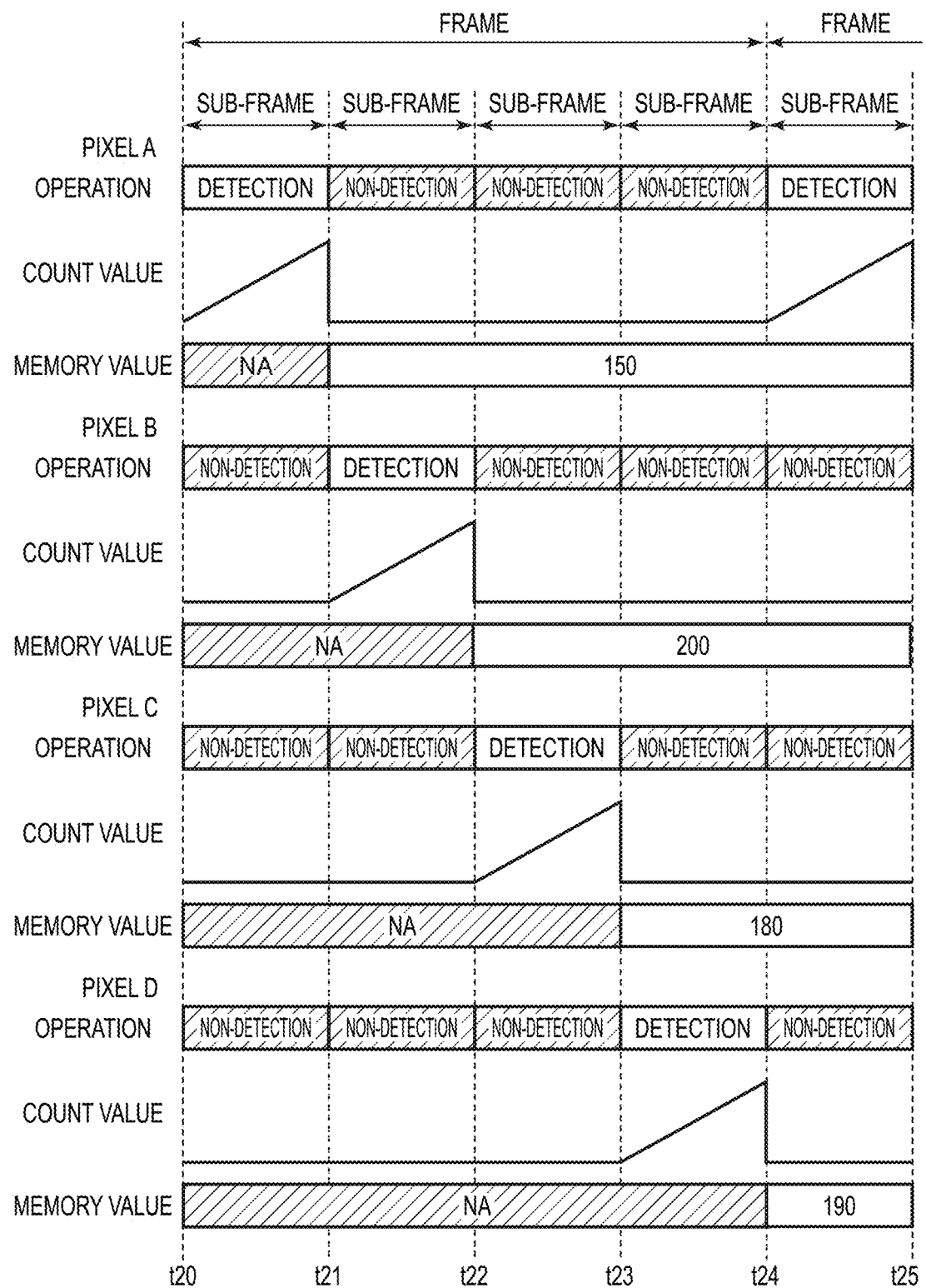
FIG. 14 is a diagram illustrating drive timings according to the fourth embodiment.

FIG. 14 is an explanatory diagram of driving timings of the pixel A, the pixel B, the pixel C, and the pixel D. FIG. 14 illustrates a detection or non-detection operation of each of the pixel A, the pixel B, the pixel C, and the pixel D, a count value of the counter 221, and a value held in the memory 222. FIG. 14 illustrates the operation in one frame period and one sub-frame period. One frame period includes four sub-frame periods. Each of times t20, t21, t22, t23, t24, and t25 is the start time and the end time of the sub-frame period. Each of the times t20 and t24 is the start time and end time of the frame period.

At the time t20, the first sub-frame period starts. In the first sub-frame period, the pixel A is in the detection state, and the pixel B, the pixel C, and the pixel D are in the non-detection state. In the pixel A, the counter 221 starts counting photons from the time t20. At the time t21, the first sub-frame period ends. The count value "150" of the counter 221 of the pixel A at the time t21 is held in the memory 222 of the pixel A.

At the time t21, the second sub-frame period starts. In the second sub-frame period, the pixel B is in the detection state, and the pixel A, the pixel C, and the pixel D are in the non-detection state. In the pixel B, the counter 221 starts counting photons from the time t21. At the time t22, the second sub-frame period ends. The count value "200" of the counter 221 of the pixel B at the time t22 is held in the memory 222 of the pixel B.

At the time t22, the third sub-frame period starts. In the third sub-frame period, the pixel C is in the detection state, and the pixel A, the pixel B, and the pixel D are in the non-detection state. In the pixel C, the counter 221 starts counting photons from the time t22. At the time t23, the third sub-frame period ends. The count value "180" of the counter 221 of the pixel C at the time t23 is held in the memory 222 of the pixel C.

At the time t23, the fourth sub-frame period starts. In the fourth sub-frame period, the pixel D is in the detection state, and the pixel A, the pixel B, and the pixel C are in the non-detection state. In the pixel D, the counter 221 starts counting photons from the time t23. At the time t24, the fourth sub-frame period ends. The count value "190" of the counter 221 of the pixel D at the time t24 is held in the memory 222 of the pixel D.

At the time t24, the count value (third count value) corresponding to the incident light in the first sub-frame period is held in the memory 222 of the pixel A, and the count value (first count value) corresponding to the incident light in the second sub-frame period is held in the memory 222 of the pixel B. The count value (fourth count value) corresponding to the incident light in the third sub-frame period is held in the memory 222 of the pixel C, and the count value (fifth count value) corresponding to the incident light in the fourth sub-frame period is held in the memory 222 of the pixel D. In this manner, the operation in one frame period from the time t20 to the time t24 ends.

In the pixel A, the incident light is not detected in the second to fourth sub-frame periods from the time t21 to the time t24. The signals corresponding to these periods are interpolated by the output value calculation unit 223 of the pixel A using the output signal of the pixel B in the second sub-frame period, the output signal of the pixel C in the third sub-frame period, and the output signal of the pixel D in the fourth sub-frame period. In addition, in the pixel B, the incident light is not detected in the first sub-frame period from the time t20 to the time t21, and in the third sub-frame period and the fourth sub-frame period from the time t22 to the time t24. The signals corresponding to these periods are interpolated by the output value calculation unit 223 of the pixel B using the output signal of the pixel A in the first sub-frame period, the output signal of the pixel C in the third sub-frame period, and the output signal of the pixel D in the fourth sub-frame period. Similar interpolation processing is performed for the pixel C and the pixel D. These interpolation processes are performed in a period after the time t24, and the processed signals are read out to the reading circuit 112 via the pixel output signal line 113.

In a period after the time t24, processing of the next one frame period is performed. Since the processing in this period is the same as the processing from the time t20 to the time t24, the description thereof will be omitted.

Figure 15A:
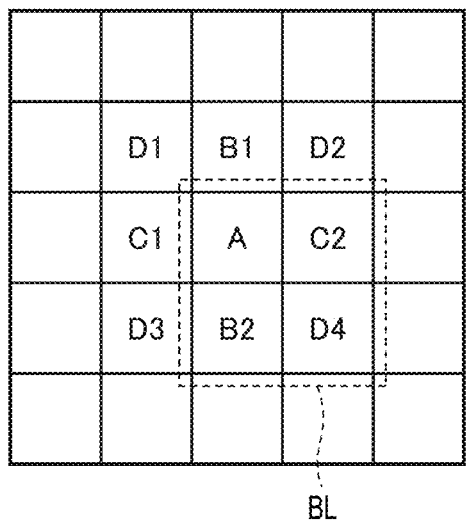
FIG. 15A and FIG. 15B are diagrams illustrating a pixel arrangement and an output value calculation unit according to the fourth embodiment.
Figure 15B:
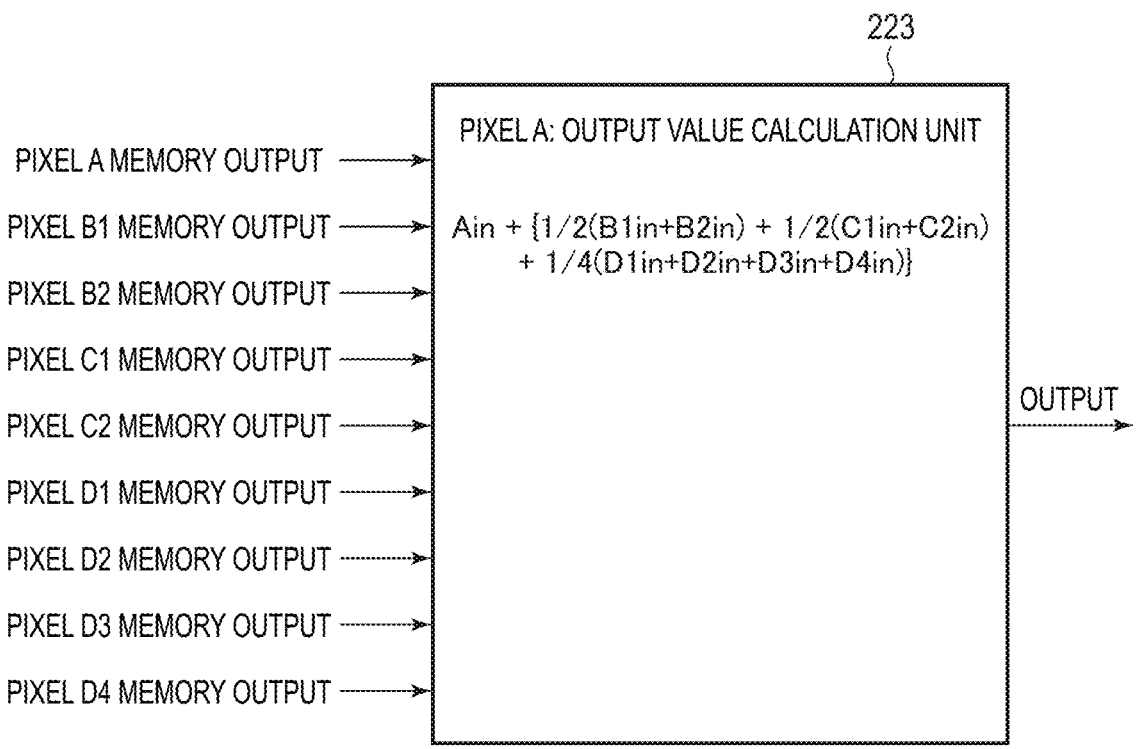

FIG. 15A is a schematic diagram illustrating positions of the pixel B, the pixel C, and the pixel D used in the interpolation processing for a center pixel A. FIG. 15B is a schematic diagram illustrating the output value calculation unit 223 of the pixel A according to the present embodiment.

As illustrated in FIG. 15A, two upper and lower pixels B of the pixel A, two right and left pixels C of the pixel A, and four diagonal pixels D of the pixel A are used for interpolation processing of the pixel A. A pixel above the pixel A is referred to as a pixel B1, and a pixel below the pixel A is referred to as a pixel B2. A pixel on the left of the pixel A is referred to as a pixel C1, and a pixel on the right of the pixel A is referred to as a pixel C2. A pixel on the upper left of the pixel A is referred to as a pixel D1, a pixel on the upper right of the pixel A is referred to as a pixel D2, a pixel on the lower left of the pixel A is referred to as a pixel D3, and a pixel on the lower right of the pixel A is referred to as a pixel D4.

As illustrated in FIG. 15B, the output values of the pixels A, B1, B2, C1, C2, D1, D2, D3, and D4 are input to the output value calculation unit 223 of the pixel A. The output value calculation unit 223 of the pixel A calculates the following expression (4) based on those input values.

$$Aout = Ain + \left\{ \frac{1}{2}(B1in + B2in) + \frac{1}{2}(C1in + C2in) + \frac{1}{4}(D1in + D2in + D3in + D4in) \right\} \quad (4)$$

In the expression (4), Aout is an output value of the output value calculation unit 223 of the pixel A, and Ain, B1in, B2in, C1in, C2in, D1in, D2in, D3in, and D4in are output values of corresponding pixels.

The first term of the expression (4) is the count value of the pixel A detected in the first sub-frame period. The second term of the expression (4) is an interpolation value corresponding to the count value of the pixel A in the second sub-frame period to the fourth sub-frame period. As indicated in the expression (4), the output value calculation unit 223 adds the first term which is the count value of the pixel A detected in the first sub-frame period and the second term which is the interpolation value, and outputs the sum. The interpolation value is calculated based on the output values of the pixels A, B1, B2, C1, C2, D1, D2, D3, and D4 as indicated in the expression (4).

According to the present embodiment, similarly to the first to third embodiments, a photoelectric conversion device capable of improving the detection accuracy of incident light is provided. Further, in the present embodiment, since the period of the non-detection state can be made longer than in the first to third embodiments, power consumption can be further reduced.

The expression (4) indicates a simple interpolation method in which weighting coefficients are ½ and ¼; however, as in the first to third embodiments, a ratio of weighting of each pixel may be made different by using interpolation parameters. Further, as in the second embodiment and the third embodiment, a parameter calculation unit 225 for calculating a value of the interpolation parameters according to output values of pixels may be further provided.

Fifth Embodiment

A photoelectric conversion device 100 according to a fifth embodiment will be described with reference to FIG. 16. In the description of the present embodiment, the description of elements common to the first to fourth embodiments may be omitted. The present embodiment is different from the first to fourth embodiments in that the number of pixels included in the pixel block BL varies depending on the position in the pixel region 12 or the first circuit region 22.

Figure 16:
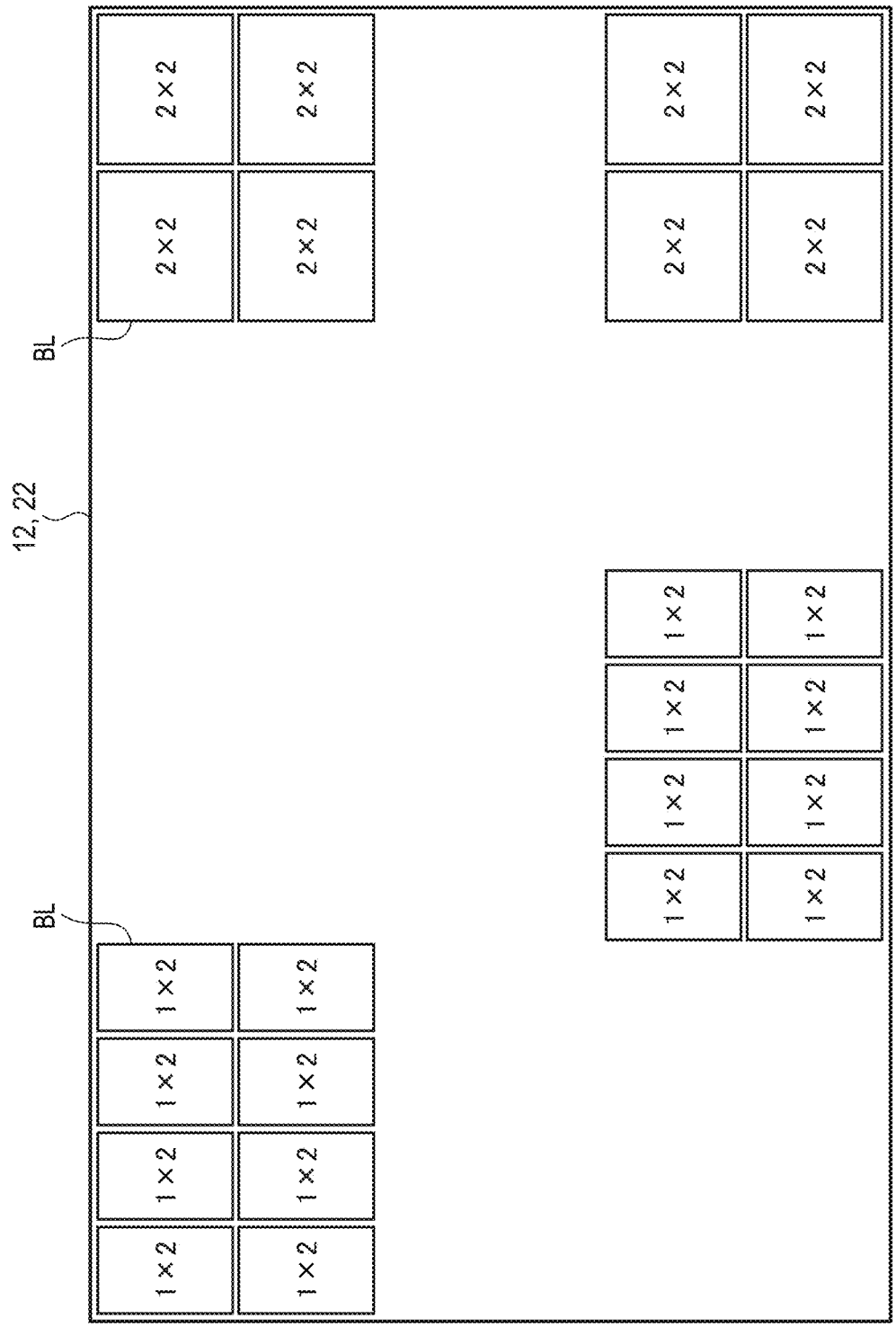
FIG. 16 is a diagram illustrating an arrangement of pixel blocks according to a fifth embodiment.

FIG. 16 is a diagram illustrating an arrangement of pixel blocks BL of the photoelectric conversion device 100 according to the present embodiment. The outer frame of FIG. 16 schematically illustrates a range of the pixel region 12 or the first circuit region 22 in plan view. In FIG. 16, a region denoted by "1×2" indicates a region of a pixel block BL including two pixels of two rows and one column as in the first embodiment, the second embodiment, or the third embodiment. In FIG. 16, a region denoted by "2×2" indicates a region of a pixel block BL including four pixels of two rows and two columns as in the fourth embodiment. The pixels in the region denoted by "1×2" or "2×2" perform an operation of switching between the detection state and the non-detection state in a plurality of sub-frame periods in one frame period, as in the first to fourth embodiments. In FIG. 16, in a pixel to which neither "1×2" nor "2×2" is indicated, a sub-frame period of a non-detection state is not provided in one frame period, and the detection state is maintained.

In general, in a photoelectric conversion element that counts incident light such as an avalanche photodiode, power consumption increases as the number of counts increases. Therefore, in accordance with the amount of incident light in the pixel region, it is desirable to arrange a pixel block BL having a large number of pixels, such as two rows and two columns, in a portion where the amount of light is high, and to apply the driving method as in the fourth embodiment to reduce power consumption. In addition, it is desirable to arrange a pixel block BL having an intermediate number of pixels, such as two rows and one column, in a portion where the amount of light is intermediate, and to apply the driving method as in the first to third embodiments to achieve both reduction of power consumption and improvement of detection accuracy. In addition, it is desirable to apply a driving method in which the pixel does not enter the non-detection state to a portion where the amount of light is weak to secure sufficient detection accuracy.

According to the present embodiment, a photoelectric conversion device capable of obtaining the same effect as any one of the first to fourth embodiments is provided. Further, in the present embodiment, by making the number of pixels included in the pixel block BL different depending on the position in the pixel region 12 or the first circuit region 22, it is possible to perform the driving in consideration of the balance between the improvement of the detection accuracy of the incident light and the reduction of the power consumption.

Sixth Embodiment

Figure 17:
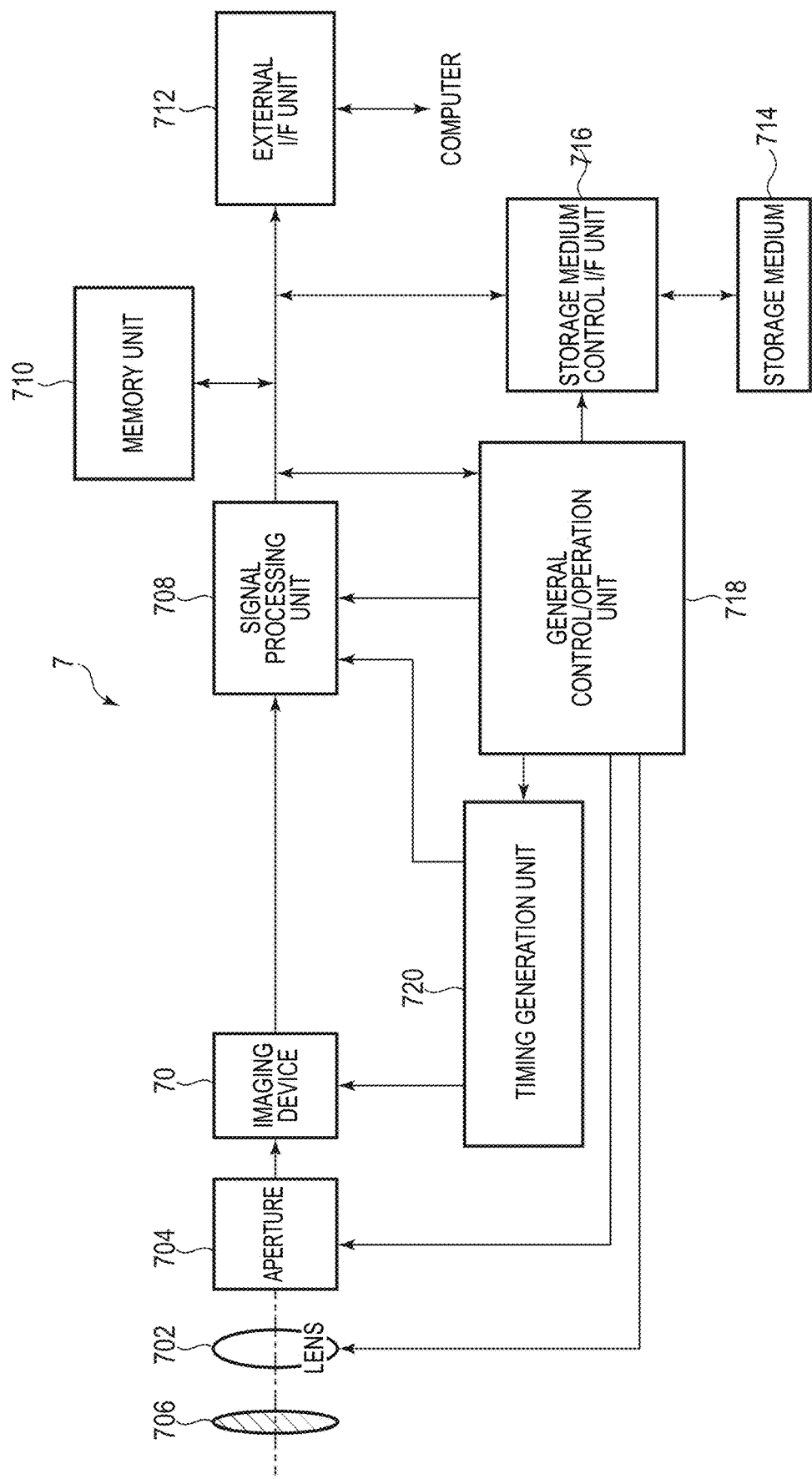
FIG. 17 is a block diagram of a photodetection system according to a sixth embodiment.

A photodetection system according to a sixth embodiment of the present invention will be described with reference to FIG. 17. FIG. 17 is a block diagram of a photodetection system according to the present embodiment. The photodetection system of the present embodiment is an imaging system that acquires an image based on incident light.

The photoelectric conversion device of the above-described embodiment may be applied to various imaging systems. Examples of the imaging system include a digital still camera, a digital camcorder, a camera head, a copying machine, a facsimile, a mobile phone, a vehicle-mounted camera, an observation satellite, and a surveillance camera. FIG. 17 is a block diagram of a digital still camera as an example of an imaging system.

The imaging system 7 illustrated in FIG. 17 includes a barrier 706, a lens 702, an aperture 704, an imaging device 70, a signal processing unit 708, a timing generation unit 720, a general control/operation unit 718, a memory unit 710, a storage medium control I/F unit 716, a storage medium 714, and an external I/F unit 712. The barrier 706 protects the lens, and the lens 702 forms an optical image of an object on the imaging device 70. The aperture 704 varies an amount of light passing through the lens 702. The imaging device 70 is configured as in the photoelectric conversion device of the above-described embodiment, and converts an optical image formed by the lens 702 into image data. The signal processing unit 708 performs various kinds of correction, data compression, and the like on the imaging data output from the imaging device 70.

The timing generation unit 720 outputs various timing signals to the imaging device 70 and the signal processing unit 708. The general control/operation unit 718 controls the entire digital still camera, and the memory unit 710 temporarily stores image data. The storage medium control I/F unit 716 is an interface for storing or reading out image data on the storage medium 714, and the storage medium 714 is a detachable storage medium such as a semiconductor memory for storing or reading out image data. The external I/F unit 712 is an interface for communicating with an external computer or the like. The timing signal or the like may be input from the outside of the imaging system 7, and the imaging system 7 may include at least the imaging device 70 and the signal processing unit 708 that processes an image signal output from the imaging device 70.

In the present embodiment, the imaging device 70 and the signal processing unit 708 may be arranged in the same semiconductor substrate. Further, the imaging device 70 and the signal processing unit 708 may be arranged in different semiconductor substrates.

Further, each pixel of the imaging device 70 may include a first photoelectric conversion unit and a second photoelectric conversion unit. The signal processing unit 708 processes a pixel signal based on a charge generated in the first photoelectric conversion unit and a pixel signal based on a charge generated in the second photoelectric conversion unit, and acquires the distance information from the imaging device 70 to the object.

Seventh Embodiment

Figure 18:
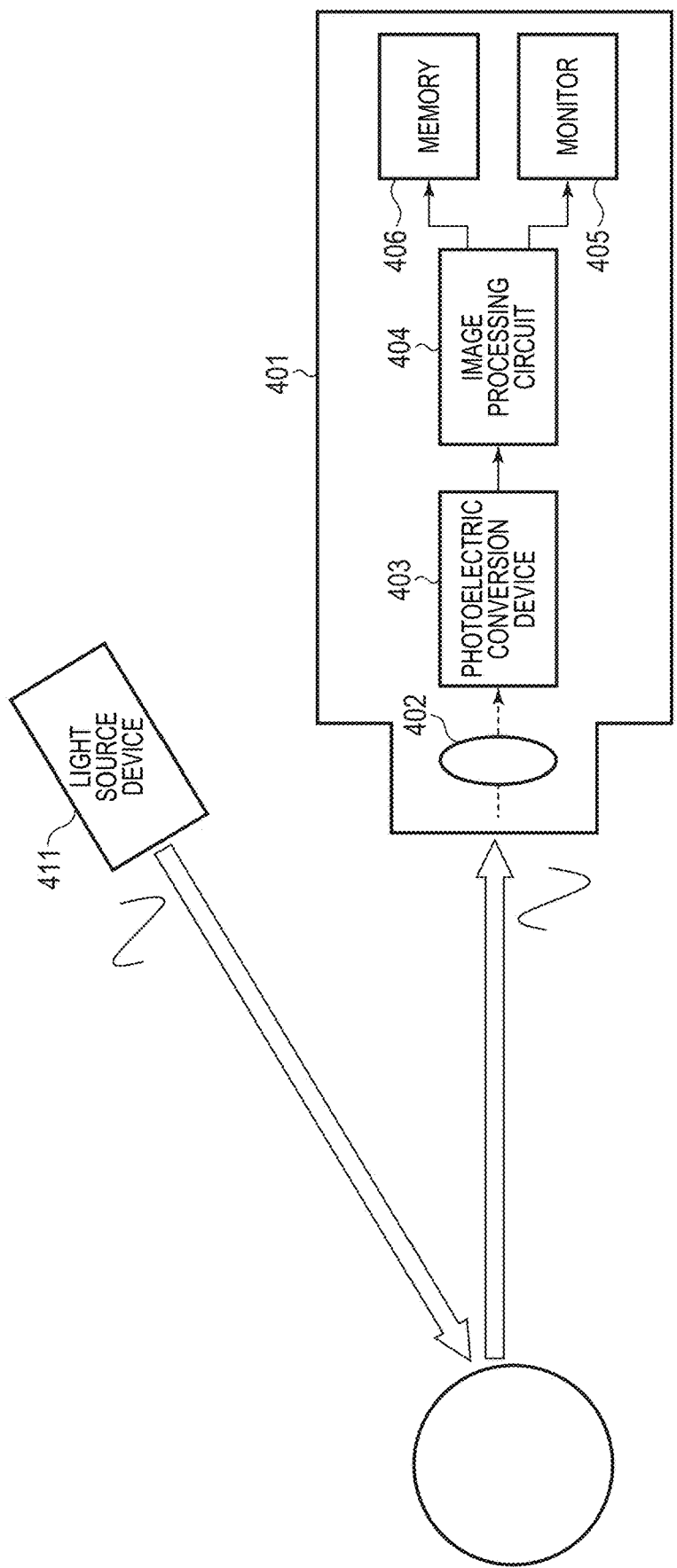
FIG. 18 is a block diagram of a photodetection system according to a seventh embodiment.

FIG. 18 is a block diagram of a photodetection system according to the present embodiment. More specifically, FIG. 18 is a block diagram of a distance image sensor using the photoelectric conversion device described in the above embodiment.

As illustrated in FIG. 18, the distance image sensor 401 includes an optical system 402, a photoelectric conversion device 403, an image processing circuit 404, a monitor 405, and a memory 406. The distance image sensor 401 receives light (modulated light or pulse light) emitted from the light source device 411 toward an object and reflected by the surface of the object. The distance image sensor 401 can acquire a distance image corresponding to a distance to the object based on a time period from light emission to light reception.

The optical system 402 includes one or a plurality of lenses, and guides image light (incident light) from the object to the photoelectric conversion device 403 to form an image on a light receiving surface (sensor unit) of the photoelectric conversion device 403.

As the photoelectric conversion device 403, the photoelectric conversion device of each of the embodiments described above can be applied. The photoelectric conversion device 403 supplies a distance signal indicating a distance obtained from the received light signal to the image processing circuit 404.

The image processing circuit 404 performs image processing for constructing a distance image based on the distance signal supplied from the photoelectric conversion device 403. The distance image (image data) obtained by the image processing can be displayed on the monitor 405 and stored (recorded) in the memory 406.

The distance image sensor 401 configured in this manner can acquire an accurate distance image by applying the photoelectric conversion device described above.

Eighth Embodiment

The technology according to the present disclosure can be applied to various products. For example, the technology according to the present disclosure may be applied to an endoscopic surgical system, which is an example of a photodetection system.

Figure 19:
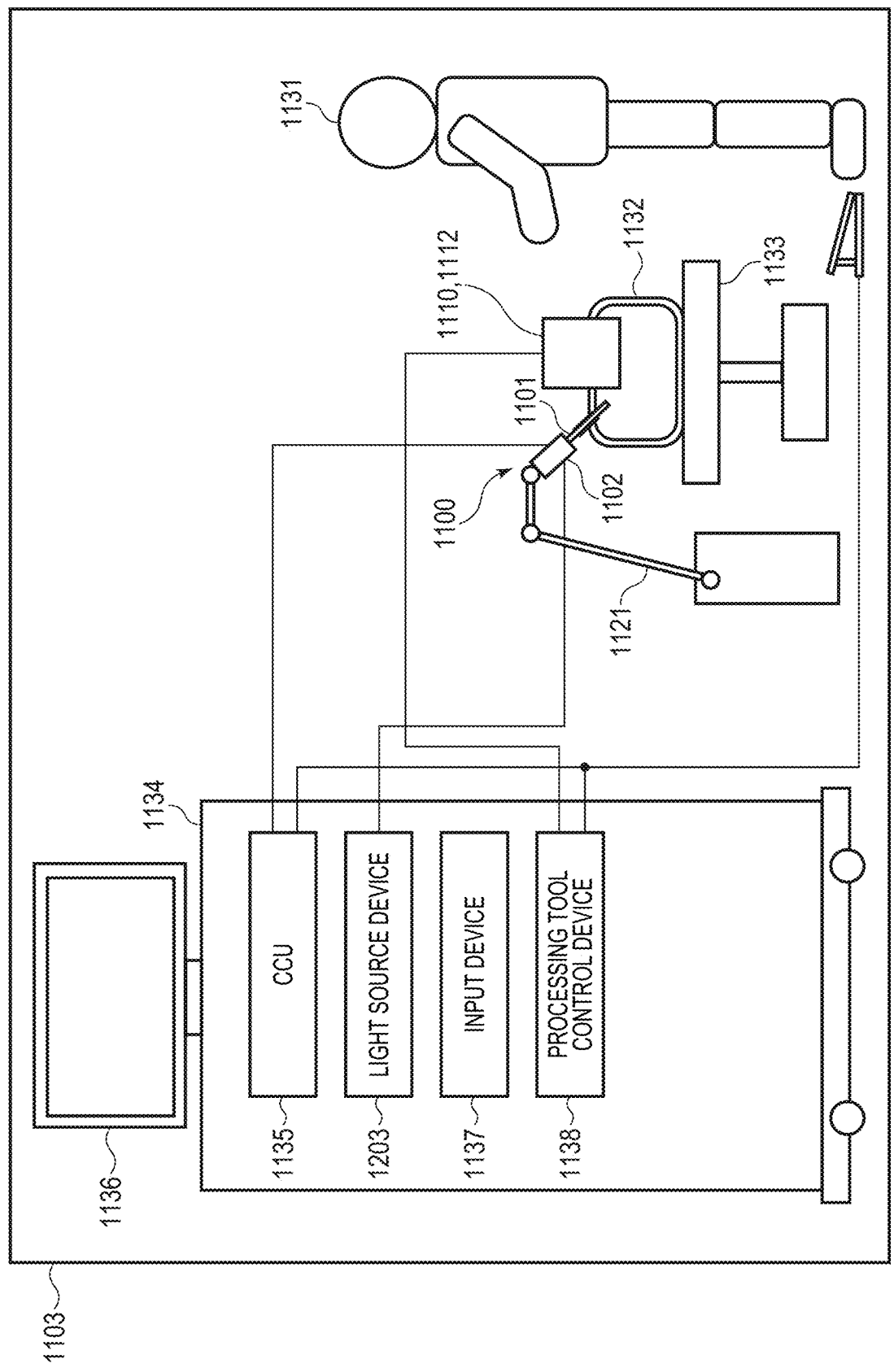
FIG. 19 is a schematic diagram of an endoscopic surgical system according to an eighth embodiment.

FIG. 19 is a schematic diagram of an endoscopic surgical system according to the present embodiment. FIG. 19 illustrates a state in which an operator (physician) 1131 performs surgery on a patient 1132 on a patient bed 1133 using an endoscopic surgical system 1103. As illustrated, the endoscopic surgical system 1103 includes an endoscope 1100, a surgical tool 1110, an arm 1121, and a cart 1134 on which various devices for endoscopic surgery are mounted.

The endoscope 1100 includes a barrel 1101 in which an area of a predetermined length from the distal end is inserted into a body cavity of a patient 1132, and a camera head 1102 connected to a proximal end of the barrel 1101. FIG. 19 illustrates an endoscope 1100 configured as a rigid scope having a rigid barrel 1101, but the endoscope 1100 may be configured as a flexible scope having a flexible barrel.

An opening into which an objective lens is fitted is provided at the distal end of the barrel 1101. A light source device 1203 is connected to the endoscope 1100. Light generated by the light source device 1203 is guided to the distal end of the barrel 1101 by a light guide extended inside the barrel 1101, and is irradiated to an observation target in the body cavity of the patient 1132 via an objective lens. The endoscope 1100 may be a straight-viewing scope an oblique-viewing scope, or a side-viewing scope.

An optical system and a photoelectric conversion device are provided inside the camera head 1102, and reflected light (observation light) from the observation target is focused on the photoelectric conversion device by the optical system. The observation light is photoelectrically converted by the photoelectric conversion device, and an electric signal corresponding to the observation light, that is, an image signal corresponding to an observation image is generated. As the photoelectric conversion device, the photoelectric conversion device described in each of the above embodiments can be used. The image signal is transmitted to a camera control unit (CCU) 1135 as RAW data.

The CCU 1135 includes a central processing unit (CPU), a graphics processing unit (GPU), and the like, and integrally controls operations of the endoscope 1100 and a display device 1136. Further, the CCU 1135 receives an image signal from the camera head 1102, and performs various types of image processing for displaying an image based on the image signal, such as development processing (demosaic processing).

The display device 1136 displays an image based on the image signal processed by the CCU 1135 under the control of the CCU 1135.

The light source device 1203 includes, for example, a light source such as a light emitting diode (LED), and supplies irradiation light to the endoscope 1100 when capturing an image of a surgical site or the like.

An input device 1137 is an input interface for the endoscopic surgical system 1103. The user can input various types of information and instructions to the endoscopic surgical system 1103 via the input device 1137.

A processing tool control device 1138 controls the actuation of the energy treatment tool 1112 for ablation of tissue, incision, sealing of blood vessels, and the like.

The light source device 1203 can supply irradiation light to the endoscope 1100 when capturing an image of a surgical site, and may be, for example, a white light source such as an LED, a laser light source, or a combination thereof. When a white light source is constituted by a combination of RGB laser light sources, the output intensity and output timing of each color (each wavelength) can be controlled with high accuracy. Therefore, the white balance of the captured image can be adjusted in the light source device 1203. In this case, laser light from each of the RGB laser light sources may be irradiated onto the observation target in a time-division manner, and driving of the imaging element of the camera head 1102 may be controlled in synchronization with the irradiation timing. Thus, images corresponding to R, G, and B can be captured in a time-division manner. According to such a method, a color image can be obtained without providing a color filter in the imaging element.

Further, the driving of the light source device 1203 may be controlled so that the intensity of the light output from the light source device 1203 is changed at predetermined time intervals. By controlling the driving of the imaging element of the camera head 1102 in synchronization with the timing of changing the intensity of light to acquire images in a time-division manner, and by synthesizing the images, it is possible to generate an image in a high dynamic range without so-called black out and white out.

Further, the light source device 1203 may be configured to be capable of supplying light in a predetermined wavelength band corresponding to special light observation. In the special light observation, for example, wavelength dependency of absorption of light in body tissue can be utilized. Specifically, predetermined tissues such as blood vessels in the surface layer of the mucosa are photographed with high contrast by irradiating light in a narrower band compared to the irradiation light (that is, white light) during normal observation. Alternatively, in the special light observation, fluorescence observation for obtaining an image by fluorescence generated by irradiation with excitation light may be performed. In the fluorescence observation, the body tissue can be irradiated with excitation light to observe fluorescence from the body tissue, or a reagent such as indocyanine green (ICG) can be locally injected to the body tissue and the body tissue can be irradiated with excitation light corresponding to the fluorescence wavelength of the reagent to obtain a fluorescence image. The light source device 1203 may be configured to supply narrowband light and/or excitation light corresponding to such special light observation.

Ninth Embodiment

A photodetection system and A movable body of the present embodiment will be described with reference to FIGS. 20, 21A, 21B, 21C, and 22. In the present embodiment, an example of an in-vehicle camera is illustrated as a photodetection system.

Figure 20:
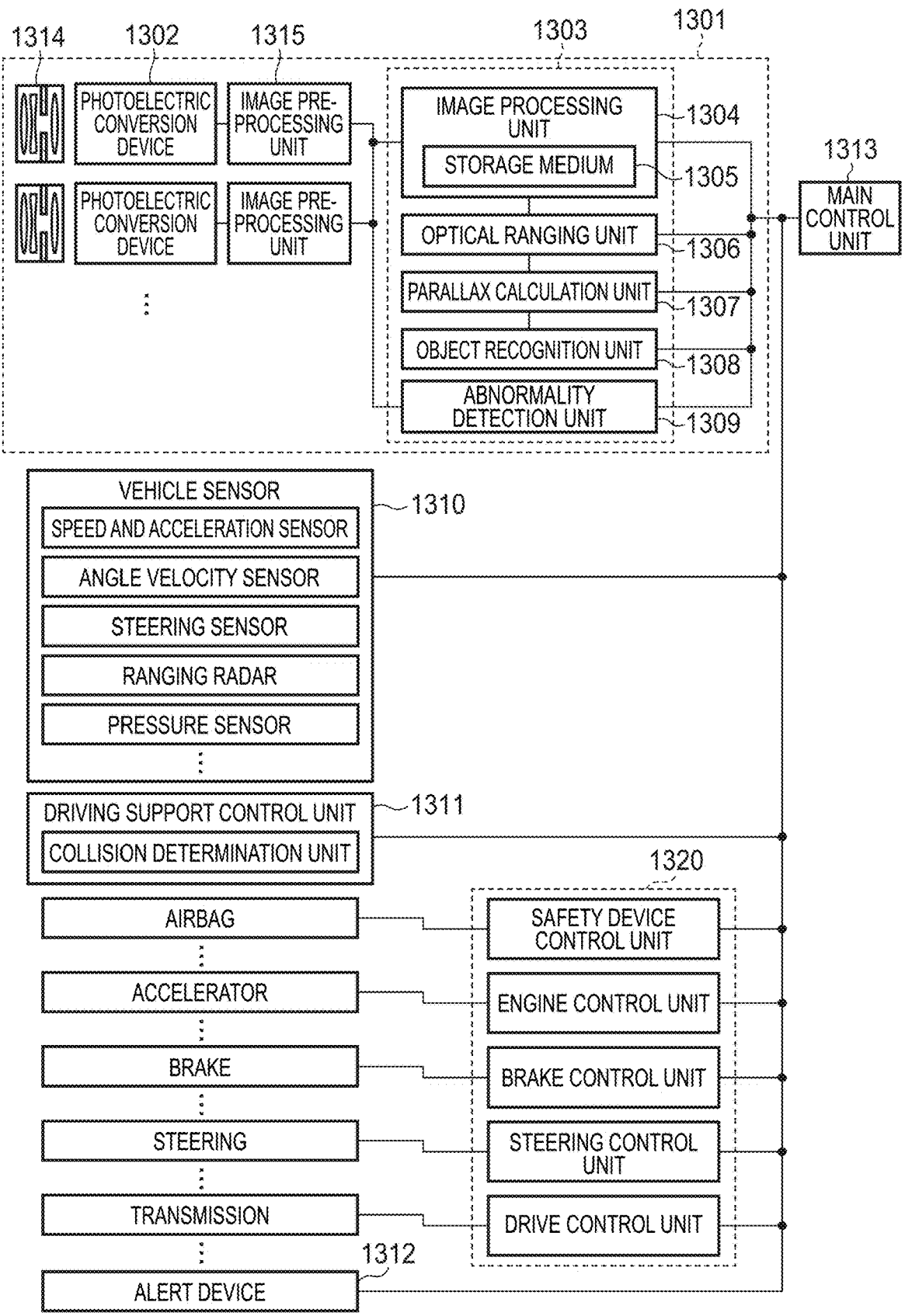
FIG. 20 is a schematic diagram of a photodetection system according to a ninth embodiment.

FIG. 20 is a schematic diagram of a photodetection system according to the present embodiment, and illustrates an example of a vehicle system and a photodetection system mounted on the vehicle system. The photodetection system 1301 includes photoelectric conversion devices 1302, image pre-processing units 1315, an integrated circuit 1303, and optical systems 1314. The optical system 1314 forms an optical image of an object on the photoelectric conversion device 1302. The photoelectric conversion device 1302 converts the optical image of the object formed by the optical system 1314 into an electric signal. The photoelectric conversion device 1302 is the photoelectric conversion device of any one of the above-described embodiments. The image pre-processing unit 1315 performs predetermined signal processing on the signal output from the photoelectric conversion device 1302. The function of the image pre-processing unit 1315 may be incorporated in the photoelectric conversion device 1302. The photodetection system 1301 is provided with at least two sets of the optical system 1314, the photoelectric conversion device 1302, and the image pre-processing unit 1315, and an output signal from the image pre-processing units 1315 of each set is input to the integrated circuit 1303.

The integrated circuit 1303 is an integrated circuit for use in an imaging system, and includes an image processing unit 1304 including a storage medium 1305, an optical ranging unit 1306, a parallax calculation unit 1307, an object recognition unit 1308, and an abnormality detection unit 1309. The image processing unit 1304 performs image processing such as development processing and defect correction on the output signal of the image pre-processing unit 1315. The storage medium 1305 performs primary storage of captured images and stores defect positions of image capturing pixels. The optical ranging unit 1306 focuses or measures the object. The parallax calculation unit 1307 calculates distance measurement information from the plurality of image data acquired by the plurality of photoelectric conversion devices 1302. The object recognition unit 1308 recognizes an object such as a car, a road, a sign, or a person. When the abnormality detection unit 1309 detects the abnormality of the photoelectric conversion device 1302, the abnormality detection unit 1309 issues an abnormality to the main control unit 1313.

The integrated circuit 1303 may be realized by dedicated hardware, a software module, or a combination thereof. It may be realized by a field programmable gate array (FPGA), an application specific integrated circuit (ASIC), or the like, or may be realized by a combination of these.

The main control unit 1313 controls overall operations of the photodetection system 1301, a vehicle sensor 1310, a control unit 1320, and the like. Without the main control unit 1313, the photodetection system 1301, the vehicle sensor 1310, and the control unit 1320 may individually have a communication interface, and each of them may transmit and receive control signals via a communication network, for example, according to the CAN standard.

The integrated circuit 1303 has a function of transmitting a control signal or a setting value to the photoelectric conversion device 1302 by receiving a control signal from the main control unit 1313 or by its own control unit.

The photodetection system 1301 is connected to the vehicle sensor 1310, and can detect a traveling state of the host vehicle such as a vehicle speed, a yaw rate, a steering angle, and the like, an environment outside the host vehicle, and states of other vehicles and obstacles. The vehicle sensor 1310 is also a distance information acquisition unit that acquires distance information to the object. The photodetection system 1301 is connected to a driving support control unit 1311 that performs various driving support functions such as an automatic steering function, an automatic cruise function, and a collision prevention function. In particular, with regard to the collision determination function, based on detection results of the photodetection system 1301 and the vehicle sensor 1310, it is determined whether or not there is a possibility or occurrence of collision with another vehicle or an obstacle. Thus, avoidance control is performed when a possibility of collision is estimated and a safety device is activated when collision occurs.

The photodetection system 1301 is also connected to an alert device 1312 that issues an alarm to a driver based on a determination result of the collision determination unit. For example, when the possibility of collision is high as the determination result of the collision determination unit, the main control unit 1313 performs vehicle control such as braking, returning an accelerator, suppressing engine output, or the like, thereby avoiding collision or reducing damage. The alert device 1312 issues a warning to a user using means such as an alarm of a sound or the like, a display of alarm information on a display unit screen such as a car navigation system and a meter panel, and a vibration application to a seatbelt and a steering wheel.

Figure 21A:
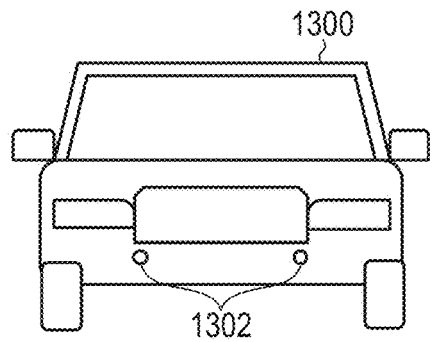
FIG. 21A, FIG. 21B, and FIG. 21C are schematic diagrams of a movable body according to the ninth embodiment.
Figure 21B:
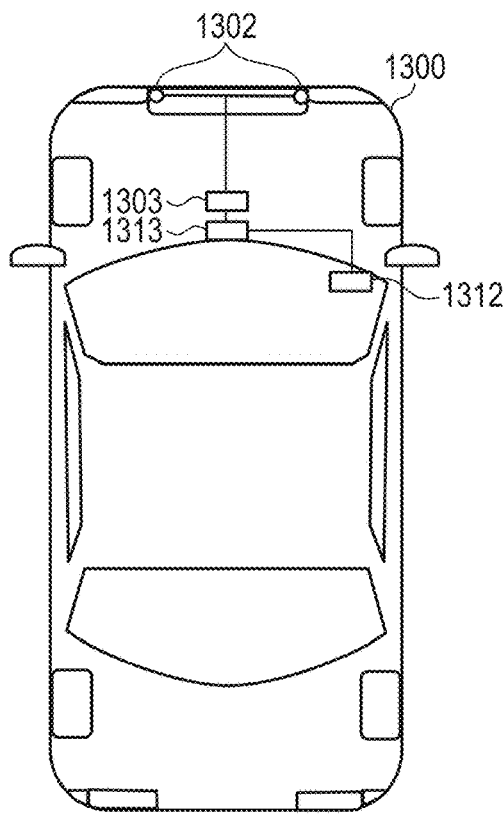
Figure 21C:
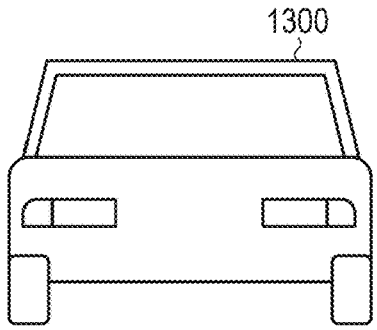

The photodetection system 1301 according to the present embodiment can capture an image around the vehicle, for example, the front or the rear. FIGS. 21A, 21B, and 21C are schematic diagrams of a movable body according to the present embodiment, and illustrate a configuration in which an image of the front of the vehicle is captured by the photodetection system 1301.

The two photoelectric conversion devices 1302 are arranged in front of the vehicle 1300. Specifically, it is preferable that a center line with respect to a forward/backward direction or an outer shape (for example, a vehicle width) of the vehicle 1300 be regarded as a symmetry axis, and two photoelectric conversion devices 1302 be arranged in line symmetry with respect to the symmetry axis. This makes it possible to effectively acquire distance information between the vehicle 1300 and the object to be imaged and determine the possibility of collision. Further, it is preferable that the photoelectric conversion device 1302 be arranged at a position where it does not obstruct the field of view of the driver when the driver sees a situation outside the vehicle 1300 from the driver's seat. The alert device 1312 is preferably arranged at a position that is easy to enter the field of view of the driver.

Figure 22:
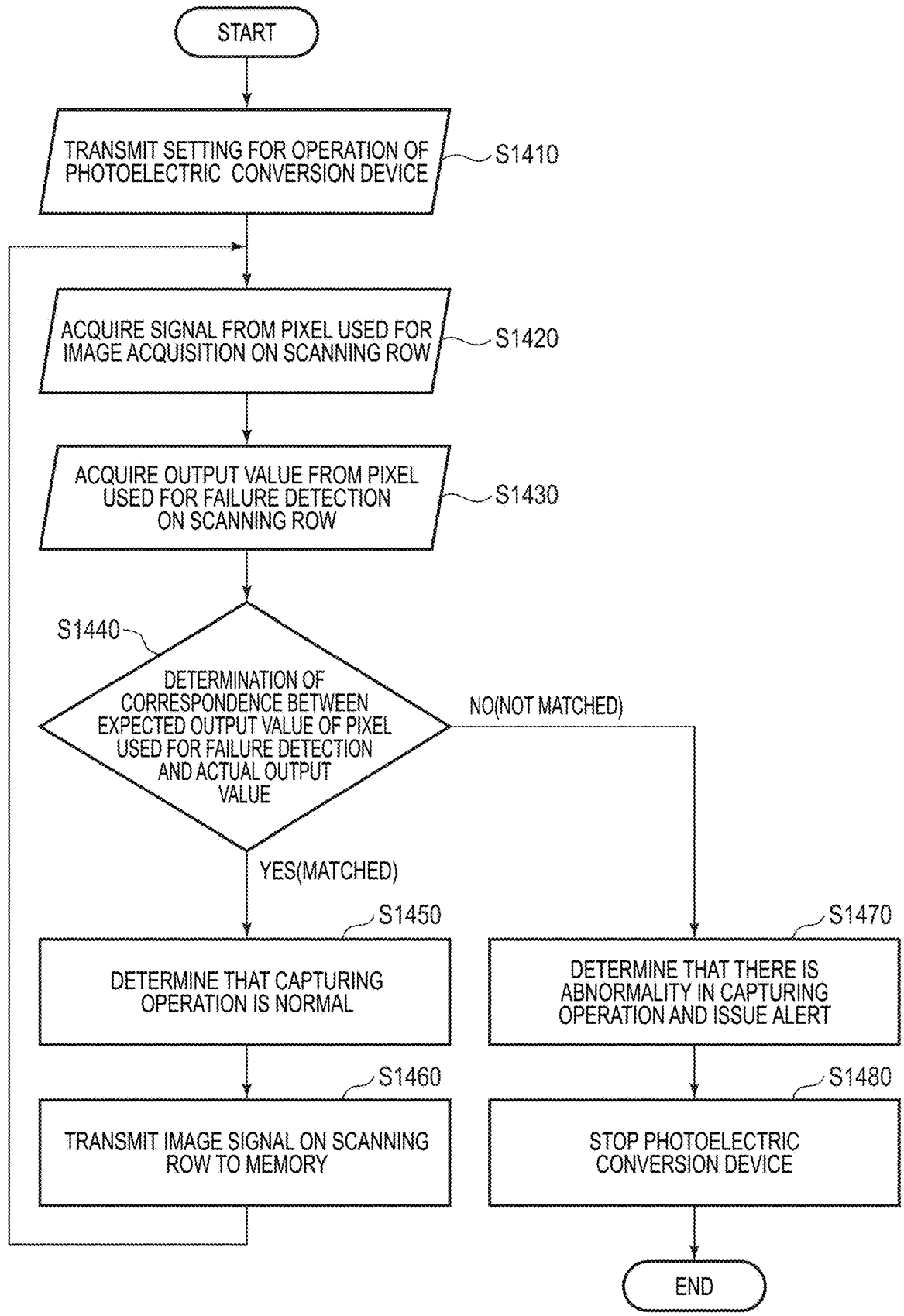
FIG. 22 is a flowchart illustrating an operation of the photodetection system according to the ninth embodiment.

Next, a failure detection operation of the photoelectric conversion device 1302 in the photodetection system 1301 will be described with reference to FIG. 22. FIG. 22 is a flowchart illustrating an operation of the photodetection system according to the present embodiment. The failure detection operation of the photoelectric conversion device 1302 may be performed according to steps S1410 to S1480 illustrated in FIG. 22.

In step S1410, the setting at the time of startup of the photoelectric conversion device 1302 is performed. That is, setting information for the operation of the photoelectric conversion device 1302 is transmitted from the outside of the photodetection system 1301 (for example, the main control unit 1313) or the inside of the photodetection system 1301, and the photoelectric conversion device 1302 starts an imaging operation and a failure detection operation.

Next, in step S1420, the photoelectric conversion device 1302 acquires pixel signals from the effective pixels. In step S1430, the photoelectric conversion device 1302 acquires an output value from a failure detection pixel provided for failure detection. The failure detection pixel includes a photoelectric conversion element in the same manner as the effective pixel. A predetermined voltage is written to the photoelectric conversion element. The failure detection pixel outputs a signal corresponding to the voltage written in the photoelectric conversion element. Steps S1420 and S1430 may be executed in reverse order.

Next, in step S1440, the photodetection system 1301 performs a determination of correspondence between the expected output value of the failure detection pixel and the actual output value from the failure detection pixel. If it is determined in step S1440 that the expected output value matches the actual output value, the photodetection system 1301 proceeds with the process to step S1450, determines that the imaging operation is normally performed, and proceeds with the process to step S1460. In step S1460, the photodetection system 1301 transmits the pixel signals of the scanning row to the storage medium 1305 and temporarily stores them. Thereafter, the process of the photodetection system 1301 returns to step S1420 to continue the failure detection operation. On the other hand, as a result of the determination in step S1440, if the expected output value does not match the actual output value, the photodetection system 1301 proceeds with the process to step S1470. In step S1470, the photodetection system 1301 determines that there is an abnormality in the imaging operation, and issues an alert to the main control unit 1313 or the alert device 1312. The alert device 1312 causes the display unit to display that an abnormality has been detected. Then, in step S1480, the photodetection system 1301 stops the photoelectric conversion device 1302 and ends the operation of the photodetection system 1301.

Although the present embodiment exemplifies the example in which the flowchart is looped for each row, the flowchart may be looped for each plurality of rows, or the failure detection operation may be performed for each frame. The alert of step S1470 may be notified to the outside of the vehicle via a wireless network.

Further, in the present embodiment, the control in which the vehicle does not collide with another vehicle has been described, but the present embodiment is also applicable to a control in which the vehicle is automatically driven following another vehicle, a control in which the vehicle is automatically driven so as not to protrude from the lane, and the like. Further, the photodetection system 1301 can be applied not only to a vehicle such as a host vehicle, but also to a movable body (movable apparatus) such as a ship, an aircraft, or an industrial robot. In addition, the present embodiment can be applied not only to a movable body but also to an apparatus utilizing object recognition such as an intelligent transport systems (ITS).

The photoelectric conversion device of the present invention may be a configuration capable of further acquiring various types of information such as distance information.

Tenth Embodiment

Figure 23A:
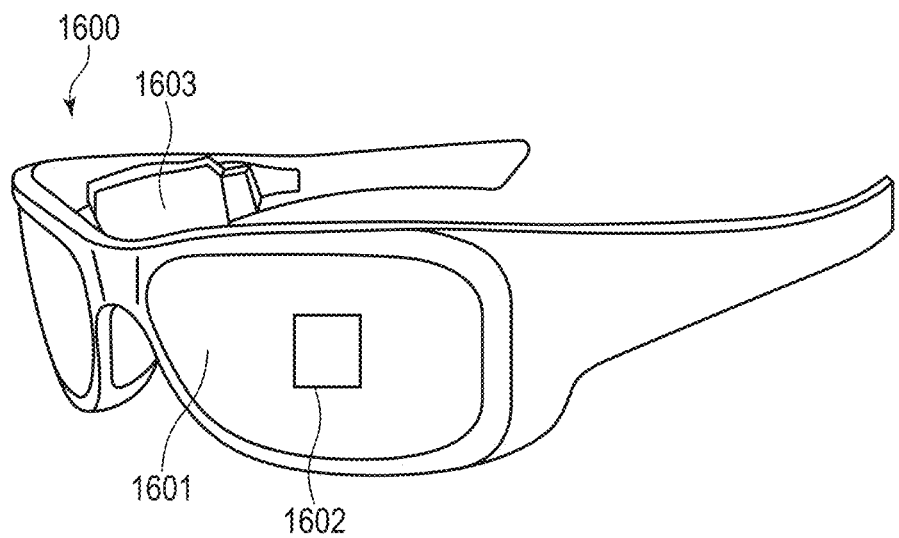
FIG. 23A and FIG. 23B are diagrams illustrating a specific example of electronic equipment according to a tenth embodiment.

FIG. 23A is a diagram illustrating a specific example of an electronic device according to the present embodiment, and illustrates glasses 1600 (smart glasses). The glasses 1600 are provided with the photoelectric conversion device 1602 described in the above embodiments. That is, the glasses 1600 are an example of a photodetection system to which the photoelectric conversion device 1602 described in each of the above embodiments can be applied. A display device including a light emitting device such as an OLED or an LED may be provided on the back surface side of the lens 1601. One photoelectric conversion device 1602 or a plurality of photoelectric conversion devices 1602 may be provided. Further, a plurality of types of photoelectric conversion devices may be combined. The arrangement position of the photoelectric conversion device 1602 is not limited to that illustrated in FIG. 23A.

The glasses 1600 further comprise a control device 1603. The control device 1603 functions as a power source for supplying power to the photoelectric conversion device 1602 and the above-described display device. The control device 1603 controls operations of the photoelectric conversion device 1602 and the display device. The lens 1601 is provided with an optical system for collecting light to the photoelectric conversion device 1602.

Figure 23B:
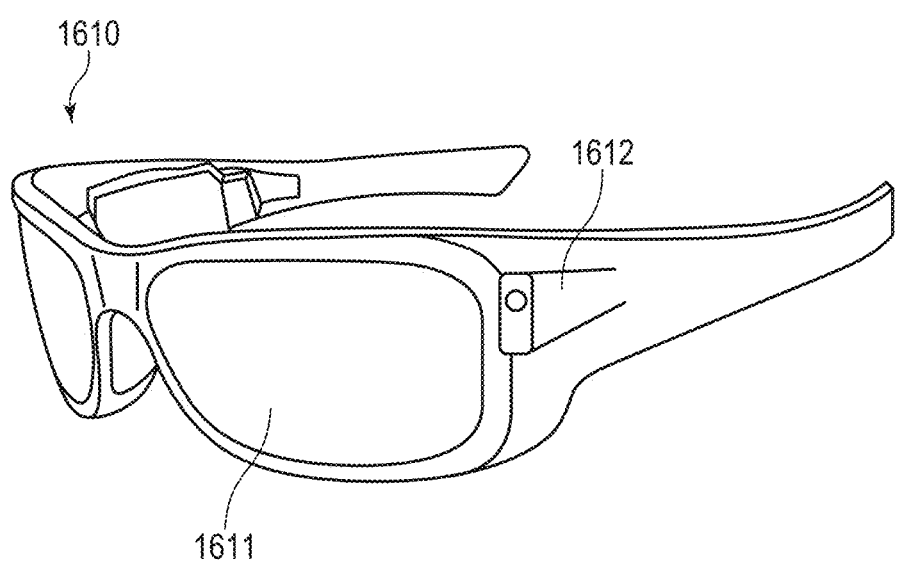

FIG. 23B illustrates glasses 1610 (smart glasses) according to one application. The glasses 1610 include a control device 1612, and a photoelectric conversion device corresponding to the photoelectric conversion device 1602 and a display device are mounted on the control device 1612. The lens 1611 is provided with a photoelectric conversion device in the control device 1612 and an optical system for projecting light emitted from a display device, and an image is projected on the lens 1611. The control device 1612 functions as a power source for supplying power to the photoelectric conversion device and the display device, and controls operations of the photoelectric conversion device and the display device. The control device 1612 may include a line-of-sight detection unit that detects the line of sight of the wearer. Infrared radiation may be used to detect the line of sight. The infrared light emitting unit emits infrared light to the eyeball of the user who is watching the display image. The reflected light of the emitted infrared light from the eyeball is detected by an imaging unit having a light receiving element, whereby a captured image of the eyeball is obtained. A reduction unit that reduces light from the infrared light emitting unit to the display unit in a plan view may be employed and the reduction unit reduces a degradation in image quality.

The control device 1612 detects the line of sight of the user with respect to the display image from the captured image of the eyeball obtained by imaging the infrared light. Any known method can be applied to the line-of-sight detection using the captured image of the eyeball. As an example, a line-of-sight detection method based on a Purkinje image due to reflection of irradiation light at a cornea can be used.

More specifically, a line-of-sight detection process based on a pupil cornea reflection method is performed. By using the pupil cornea reflection method, a line-of-sight vector representing a direction (rotation angle) of the eyeball is calculated based on the image of the pupil included in the captured image of the eyeball and the Purkinje image, whereby the line-of-sight of the user is detected.

The display device of the present embodiment may include a photoelectric conversion device having a light receiving element, and may control a display image of the display device based on line-of-sight information of the user from the photoelectric conversion device.

Specifically, the display device determines a first view field region gazed by the user and a second view field region other than the first view field region based on the line-of-sight information. The first view field region and the second view field region may be determined by a control device of the display device, or may be determined by an external control device. In the display area of the display device, the display resolution of the first view field region may be controlled to be higher than the display resolution of the second view field region. That is, the resolution of the second view field region may be lower than that of the first view field region.

The display area may include a first display region and a second display region different from the first display region. A region having a high priority may be determined from the first display region and the second display region based on the line-of-sight information. The first view field region and the second view field region may be determined by a control device of the display device, or may be determined by an external control device. The resolution of the high priority area may be controlled to be higher than the resolution of the region other than the high priority region. That is, the resolution of a region having a relatively low priority can be reduced.

It should be noted that an artificial intelligence (AI) may be used in determining the first view field region and the region with high priority. The AI may be a model configured to estimate an angle of a line of sight and a distance to a target on the line-of-sight from an image of an eyeball, and the AI may be trained using training data including images of an eyeball and an angle at which the eyeball in the images actually gazes. The AI program may be provided in either a display device or a photoelectric conversion device, or may be provided in an external device. When the external device has the AI program, the AI program may be transmitted from a server or the like to a display device via communication.

When the display control is performed based on the line-of-sight detection, the present embodiment can be preferably applied to a smart glasses which further includes a photoelectric conversion device for capturing an image of the outside. The smart glasses can display captured external information in real time.

Modified Embodiments

The present invention is not limited to the above embodiments, and various modifications are possible. For example, an example in which some of the configurations of any one of the embodiments are added to other embodiments and an example in which some of the configurations of any one of the embodiments are replaced with some of the configurations of other embodiments are also embodiments of the present invention.

The disclosure of this specification includes a complementary set of the concepts described in this specification. That is, for example, if a description of "A is B" (A=B) is provided in this specification, this specification is intended to disclose or suggest that "A is not B" even if a description of "A is not B" (A≠B) is omitted. This is because it is assumed that "A is not B" is considered when "A is B" is described.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

It should be noted that any of the embodiments described above is merely an example of an embodiment for carrying out the present invention, and the technical scope of the present invention should not be construed as being limited by the embodiments. That is, the present invention can be implemented in various forms without departing from the technical idea or the main features thereof.

According to the present invention, there is provided a photoelectric conversion device capable of improving the detection accuracy of incident light.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-081648, filed May 17, 2023, which is hereby incorporated by reference herein in its entirety.

What is claimed is:

1. A photoelectric conversion device comprising:
    a plurality of pixels each including a photoelectric conversion unit and a counting unit configured to generate a count value based on incident light to the photoelectric conversion unit; and
    a calculation unit configured to perform interpolation processing on the count value,
    wherein each of the plurality of pixels is controlled to either a first state in which generation of the count value based on the incident light is enabled or a second state in which generation of the count value based on the incident light is disabled,
    wherein the plurality of pixels includes a first pixel and a second pixel,
    wherein in a first sub-frame period in one frame period, the first pixel is controlled to the first state, and the second pixel is controlled to the second state,
    wherein in a second sub-frame period in the one frame period, the second pixel is controlled to the first state, and the first pixel is controlled to the second state, and
    wherein the calculation unit calculates a second count value of the first pixel in the second sub-frame period by performing the interpolation processing using a first count value generated in the second pixel in the second sub-frame period.

2. The photoelectric conversion device according to claim 1,
    wherein the plurality of pixels includes a plurality of second pixels, and
    wherein the calculation unit calculates a second count value of the first pixel in the second sub-frame period by performing the interpolation processing using a plurality of first count values respectively generated in the plurality of second pixels in the second sub-frame period.

3. The photoelectric conversion device according to claim 1,
    wherein the plurality of pixels includes four or more second pixels, and
    wherein the calculation unit calculates a second count value of the first pixel in the second sub-frame period by performing the interpolation processing using four or more first count values respectively generated in the four or more second pixels in the second sub-frame period.

4. The photoelectric conversion device according to claim 1, wherein the calculation unit calculates a second count value of the first pixel in the second sub-frame period by performing the interpolation processing using a third count value generated in the first pixel in the first sub-frame period and a first count value generated in the second pixel in the second sub-frame period.

5. The photoelectric conversion device according to claim 4, wherein the interpolation processing includes an operation of weighted addition of the third count value generated in the first pixel in the first sub-frame period and the first count value generated in the second pixel in the second sub-frame period.

6. The photoelectric conversion device according to claim 1, wherein the calculation unit calculates an interpolation parameter used in the interpolation processing using a third count value generated in the first pixel in the first sub-frame period and a first count value generated in the second pixel in the second sub-frame period.

7. The photoelectric conversion device according to claim 1, wherein the calculation unit is arranged corresponding to each of the plurality of pixels.

8. The photoelectric conversion device according to claim 1,
wherein the plurality of pixels are arranged to form a plurality of rows and a plurality of columns, and
wherein the calculation unit is arranged so that signals are input from a plurality of pixels in one column via a common signal line.

9. The photoelectric conversion device according to claim 1,
wherein the plurality of pixels further includes a third pixel and a fourth pixel,
wherein the one frame period includes the first sub-frame period, the second sub-frame period, a third sub-frame period, and a fourth sub-frame period, and
wherein in each of the first sub-frame period, the second sub-frame period, the third sub-frame period, and the fourth sub-frame period, a part of the first pixel, the second pixel, the third pixel, and the fourth pixel is controlled to the first state, and another part of the first pixel, the second pixel, the third pixel, and the fourth pixel is controlled to the second state.

10. The photoelectric conversion device according to claim 9, wherein in each of the first sub-frame period, the second sub-frame period, the third sub-frame period, and the fourth sub-frame period, one of the first pixel, the second pixel, the third pixel, and the fourth pixel is controlled to the first state, and the other three of the first pixel, the second pixel, the third pixel, and the fourth pixel are controlled to the second state.

11. The photoelectric conversion device according to claim 9,
wherein in the first sub-frame period, the first pixel is controlled to the first state, and the second pixel, the third pixel, and the fourth pixel are controlled to the second state,
wherein in the second sub-frame period, the second pixel is controlled to the first state, and the first pixel, the third pixel, and the fourth pixel are controlled to the second state,
wherein in the third sub-frame period, the third pixel is controlled to the first state, and the first pixel, the second pixel, and the fourth pixel are controlled to the second state, and
wherein in the fourth sub-frame period, the fourth pixel is controlled to the first state, and the first pixel, the second pixel, and the third pixel are controlled to the second state.

12. The photoelectric conversion device according to claim 11, wherein the calculation unit calculates a second count value of the first pixel from the second sub-frame period to the fourth sub-frame period by performing the interpolation processing using a first count value generated in the second pixel in the second sub-frame period, a fourth count value generated in the third pixel in the third sub-frame period, and a fifth count value generated in the fourth pixel in the fourth sub-frame period.

13. The photoelectric conversion device according to claim 1,
wherein the plurality of pixels includes a plurality of pixel blocks each including at least the first pixel and the second pixel, and
wherein the numbers of pixels included in two of the plurality of pixel blocks are different from each other.

14. The photoelectric conversion device according to claim 1,
wherein the plurality of pixels is arranged to form a plurality of rows and a plurality of columns, and
wherein the first pixel and the second pixel are adjacent to each other in either a row direction or a column direction.

15. The photoelectric conversion device according to claim 1, wherein each of the plurality of pixels further includes a transistor connected to the photoelectric conversion unit and configured to control corresponding pixel to the first state or the second state.

16. The photoelectric conversion device according to claim 15, wherein each of the plurality of pixels further includes a control unit configured to control the transistor by supplying a potential to a gate of the transistor.

17. The photoelectric conversion device according to claim 1, wherein the calculation unit adds a second count value calculated by performing the interpolation processing and a third count value generated in the first pixel in the first sub-frame period and outputs a result of addition.

18. The photoelectric conversion device according to claim 1,
wherein the photoelectric conversion unit is an avalanche photodiode, and
wherein the counting unit counts photons incident on the photoelectric conversion unit to generate the count value.

19. A photodetection system comprising:
the photoelectric conversion device according to the claim 1; and
a signal processing unit configured to process a signal output from the photoelectric conversion device.

20. A movable body comprising:
the photoelectric conversion device according to claim 1;
a distance information acquisition unit configured to acquire distance information to an object from a signal output from the photoelectric conversion device; and
a control unit configured to control the movable body based on the distance information.

* * * * *